US012636593B2

(12) United States Patent
Magnan et al.

(10) Patent No.: US 12,636,593 B2
(45) Date of Patent: *May 26, 2026

(54) PROCESSES FOR TREATING AQUEOUS COMPOSITIONS COMPRISING LITHIUM SULFATE AND SULFURIC ACID

(71) Applicant: NEMASKA LITHIUM INC., Montréal (CA)

(72) Inventors: Jean-François Magnan, Neuville (CA); Guy Bourassa, Québec (CA); Nicolas Laroche, Pont-Rouge (CA); Bertin Ouellet, Bécancour (CA); Clive Brereton, Richmond (CA); Steven Buchi, Burnaby (CA); Tsuki Naka, Vancouver (CA)

(73) Assignee: NEMASKA LITHIUM INC., Montreal (CA)

( * ) Notice: Subject to any disclaimer, the term of this patent is extended or adjusted under 35 U.S.C. 154(b) by 1326 days.

This patent is subject to a terminal disclaimer.

(21) Appl. No.: 17/397,934

(22) Filed: Aug. 9, 2021

(65) Prior Publication Data

US 2022/0032207 A1 Feb. 3, 2022

Related U.S. Application Data

(63) Continuation of application No. 16/328,220, filed as application No. PCT/CA2017/051007 on Aug. 28, 2017, now Pat. No. 11,083,978.

(Continued)

(30) Foreign Application Priority Data

Aug. 26, 2016 (CA) ................................. CA 2940509

(51) Int. Cl.
*B01D 9/00* (2006.01)
*C01D 15/06* (2006.01)

(52) U.S. Cl.
CPC ......... *B01D 9/0031* (2013.01); *B01D 9/0013* (2013.01); *B01D 9/0022* (2013.01); *B01D 9/0077* (2013.01); *C01D 15/06* (2013.01)

(58) Field of Classification Search
CPC .. B01D 9/0031; B01D 9/0013; B01D 9/0077; B01D 9/0059; B01D 9/0022; C01D 15/06; C25B 1/16; C30B 7/04; C30B 29/46
See application file for complete search history.

(56) References Cited

U.S. PATENT DOCUMENTS 2,331,838 A 10/1943 Lindblad et al.
2,516,109 A 7/1950 Ellestad et al.
(Continued)

FOREIGN PATENT DOCUMENTS

AU 2012211033 8/2012
AU 2012261548 1/2013
(Continued)

OTHER PUBLICATIONS

English Translation—Machine Translation of JP2016162601A, "Method of Manufacturing Positive Electrode Active Material for Lithium Ion Battery, Positive Electrode Active Material for Lithium Battery, Positive Electrode for Lithium Ion Battery, and Lithium Ion Battery", published on Sep. 5, 2016.
(Continued)

*Primary Examiner* — Melvin C. Mayes
*Assistant Examiner* — Tienna Marie Deroy
(74) *Attorney, Agent, or Firm* — SMART & BIGGAR LP

(57) ABSTRACT

Processes for treating an aqueous composition comprising lithium sulfate and sulfuric acid. The processes comprise evaporatively crystallizing the aqueous composition comprising lithium sulfate and sulfuric acid under conditions to obtain crystals of lithium sulfate monohydrate and a lithium (Continued)

sulfate-reduced solution; and optionally separating the crystals of the lithium sulfate monohydrate from the lithium sulfate-reduced solution. The processes optionally further comprise concentrating the lithium sulfate-reduced solution under conditions to obtain an acidic condensate and a concentrate comprising sulfuric acid.

9 Claims, 31 Drawing Sheets

Related U.S. Application Data

(60) Provisional application No. 62/380,056, filed on Aug. 26, 2016.

(56) References Cited

U.S. PATENT DOCUMENTS

| | | |
|---|---|---|
| 2,793,941 A | 5/1957 | Estes |
| 2,872,393 A | 2/1959 | Gardiner et al. |
| 2,882,243 A | 4/1959 | Milton |
| 3,007,771 A | 11/1961 | Mazza et al. |
| 3,214,362 A | 10/1965 | Juda |
| 3,597,340 A | 8/1971 | Honeycutt et al. |
| 3,857,920 A | 12/1974 | Grantham et al. |
| 3,899,403 A | 8/1975 | Cook, Jr. et al. |
| 4,035,713 A | 7/1977 | Kawamoto et al. |
| 4,036,713 A | 7/1977 | Brown |
| 4,207,297 A | 6/1980 | Brown et al. |
| 4,273,628 A | 6/1981 | Kidon et al. |
| 4,287,163 A | 9/1981 | Garrett et al. |
| 4,391,680 A | 7/1983 | Mani et al. |
| 4,504,373 A | 3/1985 | Mani et al. |
| 4,561,945 A | 12/1985 | Coker et al. |
| 4,613,416 A | 9/1986 | Kau et al. |
| 4,707,234 A | 11/1987 | Mori et al. |
| 4,723,962 A | 2/1988 | Mehta |
| 4,806,215 A | 2/1989 | Twardowski |
| 4,961,909 A | 10/1990 | Boateng |
| 4,999,095 A | 3/1991 | Chlanda et al. |
| 5,098,532 A | 3/1992 | Thompson et al. |
| 5,129,936 A | 7/1992 | Wilson |
| 5,198,080 A | 3/1993 | Cowley et al. |
| 5,198,081 A | 3/1993 | Kanoh et al. |
| 5,227,031 A | 7/1993 | Sundblad |
| 5,230,779 A | 7/1993 | Martin |
| 5,246,551 A | 9/1993 | Pletcher et al. |
| 5,258,106 A | 11/1993 | Habermann et al. |
| 5,401,408 A | 3/1995 | Umemura et al. |
| 5,423,959 A | 6/1995 | Sundblad et al. |
| 5,445,717 A | 8/1995 | Kärki et al. |
| 5,595,641 A | 1/1997 | Traini et al. |
| 5,788,943 A | 8/1998 | Aladjov |
| 6,004,445 A | 12/1999 | Genders et al. |
| 6,048,507 A | 4/2000 | Amouzegar et al. |
| 6,120,576 A | 9/2000 | Toshima et al. |
| 6,306,787 B1 | 10/2001 | Sato et al. |
| 6,331,236 B1 | 12/2001 | Mani |
| 6,375,824 B1 | 4/2002 | Phinney |
| 6,514,311 B1 | 2/2003 | Lin et al. |
| 6,514,640 B1 | 2/2003 | Armand et al. |
| 6,547,836 B1 | 4/2003 | Lukes |
| 6,592,832 B1 | 7/2003 | Friedrich et al. |
| 6,747,065 B1 | 6/2004 | Paszkowski |
| 6,770,187 B1 | 8/2004 | Pütter et al. |
| 7,192,564 B2 | 3/2007 | Cardarelli et al. |
| 7,695,649 B2 | 4/2010 | Paulsen et al. |
| 8,431,005 B1 | 4/2013 | Zbranek et al. |
| 8,715,482 B2 | 5/2014 | Amendola et al. |
| 8,936,711 B2 | 1/2015 | Chon et al. |
| 8,936,770 B2 | 1/2015 | Burba, III |
| 8,951,399 B2 | 2/2015 | Fischer et al. |
| 9,255,011 B2 | 2/2016 | Kawata et al. |
| 9,255,012 B2 | 2/2016 | Tiihonen et al. |
| 9,315,908 B2 | 4/2016 | Idutsu et al. |
| 9,382,126 B2 | 7/2016 | Bourassa et al. |
| 9,447,480 B2 | 9/2016 | Vaughan et al. |
| 9,493,881 B2 | 11/2016 | Kosmoski et al. |
| 9,677,181 B2 | 6/2017 | Bourassa et al. |
| 9,702,024 B2 | 7/2017 | Wohlgemuth et al. |
| 9,890,053 B2 | 2/2018 | Bourassa et al. |
| 10,036,094 B2 | 7/2018 | Magnan et al. |
| 10,066,305 B2 | 9/2018 | Bourassa et al. |
| 10,144,990 B2 | 12/2018 | Bourassa et al. |
| 10,450,630 B2 | 10/2019 | Johnson et al. |
| 10,544,512 B2 | 1/2020 | Magnan et al. |
| 10,597,305 B2 | 3/2020 | Magnan et al. |
| 10,633,748 B2 | 4/2020 | Bourassa et al. |
| 10,661,227 B2 | 5/2020 | Park et al. |
| 10,800,663 B2 | 10/2020 | Bourassa et al. |
| 11,078,582 B2 | 8/2021 | Chang et al. |
| 11,083,978 B2* | 8/2021 | Magnan ............... B01D 9/0013 |
| 11,697,861 B2 | 7/2023 | Bourassa et al. |
| 2001/0040093 A1 | 11/2001 | Mani |
| 2005/0051488 A1 | 3/2005 | Nagghappan et al. |
| 2006/0105239 A1 | 5/2006 | Paulsen et al. |
| 2011/0044882 A1 | 2/2011 | Buckley et al. |
| 2011/0123427 A1 | 5/2011 | Boryta et al. |
| 2011/0182786 A1 | 7/2011 | Burba, III |
| 2011/0200508 A1 | 8/2011 | Harrison et al. |
| 2011/0203929 A1 | 8/2011 | Buckley et al. |
| 2012/0085658 A1 | 4/2012 | Bhavaraju et al. |
| 2012/0107210 A1 | 5/2012 | Harrison et al. |
| 2013/0153433 A1 | 6/2013 | Idutsu et al. |
| 2014/0010743 A1 | 1/2014 | Kosmoski et al. |
| 2014/0023572 A1 | 1/2014 | Vaughan et al. |
| 2015/0041323 A1 | 2/2015 | Faita |
| 2015/0139886 A1 | 5/2015 | Bourassa et al. |
| 2015/0247216 A1 | 9/2015 | Wohlgemuth et al. |
| 2015/0364761 A1 | 12/2015 | Fukui et al. |
| 2016/0032471 A1 | 2/2016 | Magnan et al. |
| 2016/0258071 A1 | 9/2016 | Magnan et al. |
| 2016/0265085 A1 | 9/2016 | Bourassa et al. |
| 2016/0304988 A1 | 10/2016 | Vaughan et al. |
| 2017/0233848 A1 | 8/2017 | Johnson et al. |
| 2018/0244531 A1 | 8/2018 | Magnan et al. |
| 2018/0327287 A1 | 11/2018 | Melsert |
| 2019/0032227 A1 | 1/2019 | Lipp et al. |
| 2019/0345582 A1 | 11/2019 | Bourassa et al. |
| 2020/0087804 A1 | 3/2020 | Magnan et al. |
| 2020/0115807 A1 | 4/2020 | Magnan et al. |
| 2020/0376409 A1 | 12/2020 | Magnan et al. |
| 2020/0407237 A1 | 12/2020 | Bourassa et al. |
| 2021/0024362 A1 | 1/2021 | Bourassa et al. |
| 2023/0382753 A1 | 11/2023 | Bourassa et al. |
| 2023/0416874 A1 | 12/2023 | Bourassa et al. |

FOREIGN PATENT DOCUMENTS

| | | |
|---|---|---|
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2624609 C | 4/2007 |
| CA | 2624612 C | 4/2007 |
| CA | 2786317 | 7/2011 |
| CA | 2796849 | 10/2011 |
| CA | 2820112 | 6/2012 |
| CA | 2825583 | 8/2012 |
| CN | 103086405 | 5/2013 |
| CN | 106315625 | 1/2017 |
| CN | 106365181 | 2/2017 |
| CN | 109694957 | 4/2019 |
| DE | 102004012334 A1 | 9/2005 |
| JP | 5795826 | 6/1982 |
| JP | 2000129364 A | 5/2000 |
| JP | 2008166269 | 7/2008 |
| JP | 2009298679 | 12/2009 |
| JP | 2010080394 | 4/2010 |
| JP | 2013028523 | 2/2013 |
| JP | 2013173629 | 9/2013 |

(56) References Cited

FOREIGN PATENT DOCUMENTS

| JP | 2013227180 | | 11/2013 | | |
| JP | 2016162601 | A | 9/2016 | | |
| RU | 2196735 | | 1/2003 | | |
| SU | 310538 | | 8/1974 | | |
| WO | 9859385 | | 12/1998 | | |
| WO | 2004040677 | | 5/2004 | | |
| WO | 2007039665 | | 4/2007 | | |
| WO | 2010056322 | | 5/2010 | | |
| WO | 2010103173 | | 9/2010 | | |
| WO | 2011114000 | | 9/2011 | | |
| WO | 2011133165 | | 10/2011 | | |
| WO | 2011148040 | | 12/2011 | | |
| WO | 2011156861 | | 12/2011 | | |
| WO | 2012145797 | | 11/2012 | | |
| WO | 2013140039 | | 9/2013 | | |
| WO | 2013153692 | | 10/2013 | | |
| WO | 2013159194 | | 10/2013 | | |
| WO | 2013182749 | | 12/2013 | | |
| WO | 2014040138 | | 3/2014 | | |
| WO | 2014138933 | | 9/2014 | | |
| WO | 2015058287 | | 4/2015 | | |
| WO | 2015081385 | | 6/2015 | | |
| WO | 2015123762 | | 8/2015 | | |
| WO | WO-2015123762 | A1 * | 8/2015 | ........... | B01D 61/025 |
| WO | 2016054683 | | 4/2016 | | |
| WO | 2017144469 | | 8/2017 | | |
| WO | 2017157906 | | 9/2017 | | |
| WO | 2018087697 | | 5/2018 | | |
| WO | 2018223192 | | 12/2018 | | |
| WO | 2018223193 | | 12/2018 | | |
| WO | 2018227237 | | 12/2018 | | |
| WO | 2018234614 | | 12/2018 | | |
| WO | 2019059654 | | 3/2019 | | |

OTHER PUBLICATIONS

English Abstract of JP2013028523A, "Method for Producing Manganese Oxide", published on Feb. 7, 2013.

Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7 (2004). (The year of publication is sufficiently earlier than the effective U.S. filing date so that the particular month of publication is not an issue).

English Translation—Machine Translation of JP2000129364A, "Method for Recovering Metal", published on May 9, 2000.

Communication pursuant to Rule 114(2) EPC—Third Palty Observation for application No. EP3713877 dated Apr. 17, 2023.

English Abstract of China Lithium Products Tech. Co., Ltd., "Lithium Hydroxide Purified Grade", Published on Jun. 6, 2011.

English Abstract of PH12013501570A1, "Improved Method of Ore Processing", published on Sep. 30, 2013.

English Abstract of Scribd, "Extraction, Properties and Use of Lithium", Published on Feb. 2, 2009.

English Abstract of Sun et al., "Preparation of Li2CO3 by Gas-Liquid Reactive Crystallization of LiOH and CO2", Published on Jan. 31, 2012.

Tipping et al., "Conditions Required for the Precipitation of Aluminium in Acidic Natural Waters", Wat. Res. vol. 22, No. 5, pp. 585-592, 1988. (The year of publication is sufficiently earlier than the effective U.S. filing date so that the particular month of publication is not an issue).

Communication pursuant to Rule 114(2) EPC—Third Party Observation for application No. EP20140764466 dated Jan. 13, 2021.

English Abstract of CL2012002968(A1), "Method for preparing lithium carbonate from brines containing lithium chloride which comprises contacting the salumera with sodium hydroxide and then contacting with carbon dioxide", published on Jan. 11, 2013.

English Abstract of CN102030346 (A), "Preparation method for lithium carbonate", Published on Apr. 7, 2011.

English Abstract of CN106315625A, "Method for Composite Production of High-Purity Lithium Hydroxide Monohydrate, High-Purity Lithium Carbonate and Battery Grade Lithium Carbonate", published on Jan. 11, 2017.

English Abstract of CN106365181A, "Method of Preparing Battery-Grade Lithium Carbonate from Lithium-Rich Solution Being High in Content of Impurities", published on Feb. 1, 2017.

English Abstract of JP62161973A, "Production of High-Purity Lithium Carbonate", Published on Jul. 17, 1987.

English Abstract of JP2004196606(A), "Method for Manufacturing High Purity Lithium Carbonate", Published on Jul. 15, 2004.

English Abstract of JP2004196607(A), "Method for Manufacturing High Purity Lithium Carbonate", Published on Jul. 15, 2004.

English Abstract of JP2009046390(A), "Production Method of High Purity Lithium Carbonate", Published on Mar. 5, 2009.

English Abstract of JP2009057278(A), "Method of Manufacturing High Purity Lithium Carbonate", Published on Mar. 19, 2009.

English Abstract of JP2009270188(A), "Method of Manufacturing High-Purity Lithium Hydroxide", published on Nov. 19, 2009.

English Abstract of JP2009270189A, "Method of Manufacturing High-Purity Lithium Hydroxide", published on Nov. 19, 2009.

English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.

English Abstract of JP2011031232, "Method of Manufacturing Lithium Hydroxide", published on Feb. 17, 2011.

English Abstract of JP2013173629A, "Method of Producing High-Purity Lithium Hydroxide", Published on Sep. 5, 2013.

English Abstract of JPS5443174(A), "Preparation of Lithium Hydroxide", Published on Apr. 5, 1979.

English Abstract of KR20130092323(A), "Lithium Compound Recovering Device, Method for Recovering Lithium Compound and Lithium Compound Recovering System", published on Aug. 20, 2013.

English Abstract—Machine Translation of JP2013227180A, "Method for Producing Lithium Sulfide", published on Nov. 7, 2013.

English Abstract—Machine Translation of JPS5798826A, "Manufacture of High Purity Lithium Salt of Mineral Acid", published on Jun. 14, 1982.

English Abstract of *Helmold* v. *Plessen, Heinz Kau*, "Utilization of sodium sulphate", Chem.- Ing.-Tech. 61 (1989) 12, pp. 933-940. (The year of publication is sufficiently earlier than the effective U.S. filing date so that the particular month of publication is not an issue).

English Translation—Machine Generated of JP2010080394A, "Positive Electrode Active Material for Nonaqueous Electrolyte Secondary Battery and Manufacturing Method Therefor, and Nonaqueous Electrolyte Secondary Battery", Published on Apr. 8, 2010.

English Translation—Machine Generated—Description of SU310538, published on Aug. 5, 1974.

English Translation of RU2196735C1, "Method for Producing High Purity Lithium Hydroxide Monohydrate From Materials Containing Lithium Carbonate", Published on Jan. 20, 2003.

Koter et al., "Electromembrane Processes in Environment Protection", Polish Journal of Environmental Studies vol. 9, No. 1 (2000), 45-56.

John Jacco Krol, "Monopolar and Bipolar Ion Exchange Membranes", Mass Transport Limitations, published on Aug. 25, 1969.

Ogawa et al., "Effects of the Chemical Compositions of Salars de Uyuni and Atacama Brines on Lithium Concentration during Evaporation" Resource Geology, vol. 64, No. 2: 91-101, Mar. 2014.

Sitando et al., "Processing of a Zimbabwean Petalite to Obtain Lithium Carbonate", International Journal of Mineral Processing, 102-103 (2012) 45-50 (Available Online: Oct. 1, 2011).

Tongwen Xu, "Ion exchange membranes: State of their development and perspective", Journal of Membrane Science 263 (2005) 1-29.

Ulrich Joachim, "Crystallization", Kirk Othmer Encyclopedia of Chemical Technology, vol. 8 (Aug. 16, 2002), pp. 95-147.

Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.

(56)                    References Cited

OTHER PUBLICATIONS

Liang et al., "Co-precipitation synthesis of Ni0.6Co0.2Mn0.2(OH)2 precursors and characterization of LiNi0.6Co0.2O2 cathode material for secondary lithium batteries", Electrochimica Acta 130 (Mar. 3, 2014) 82-89.

Kim et al., "Synthesis of High-Density Nickel Cobalt Aluminum Hydroxide by Continuous Coprecipitation Method", ACS Appl. Mater. Interfaces (Jan. 10, 2012), 4, 586-589.

English Translation—Machine Generated of de102004012334A1, "Method for preparing metal hydroxide from sparingly soluble salt, useful particularly for making lithium hydroxide, uses an electrodialysis cell, supplied with concentrated aqueous salt solution", published on Sep. 22, 2005.

English Translation—Machine Generated of CN103086405A, "Clean Production Method of Battery Level Lithium Carbonate", published on May 8, 2013.

English Translation—Machine Generated of CN109694957A, "A Lithium Ion Battery using Ion Liquid Extraction Method of the Metal Ion of the Leachate", published on Apr. 30, 2019.

English Translation—Machine Generated of JP2008166269A, "Li—Ni Compound Oxide Particle Powder for Nonaqueous Electrolyte Secondary Battery and its Manufacturing Method, as well as Nonaqueous Electrolyte Secondary Battery", published on Jul. 17, 2008.

English Translation—Machine Generated of JP2009298679A, "Production Method of Aluminum-Containing Nickel Hydroxide Particle", published on Dec. 24, 2009.

English Translation—Machine Generated of CN106315625(A), "Method for Composite Production of High-Purity Lithium Hydroxide Monohydrate, High-Purity Lithium Carbonate and Battery Grade Lithium Carbonate", published on Jan. 11, 2017.

English Translation—Machine Generated of CN106365181(A), "Method of Preparing Battery-Grade Lithium Carbonate from Lithium-Rich Solution being High in Content of Impurities", published on Feb. 1, 2017.

English Translation of WO2013153692A1, "Method for Recovering Lithium", published on Oct. 17, 2013.

English Translation—Machine Generated of WO2019059654A1, "Cathode Active Material Precursor for Secondary Battery, Cathode Active Material, and Lithium Secondary Battery Comprising Same", published on Mar. 28, 2019.

* cited by examiner

PROCESSES FOR TREATING AQUEOUS COMPOSITIONS COMPRISING LITHIUM SULFATE AND SULFURIC ACID

CROSS-REFERENCE TO RELATED APPLICATIONS

The present application is a continuation of U.S. Ser. No. 16/328,220 filed on Feb. 25, 2019 that is a 35 USC 371 national stage entry of PCT/CA2017/051007 filed on Aug. 28, 2017 and which claims priority on U.S. 62/380,056 filed on Aug. 26, 2016 and on CA 2,940,509 filed on Aug. 26, 2016. These documents are hereby incorporated by reference in their entirety.

FIELD

The present disclosure relates to processes for treating aqueous solutions comprising lithium sulfate and sulfuric acid.

BACKGROUND

There have been some reports of the phase behavior of the binary lithium sulfate/water system and ternary lithium sulfate/sulfuric acid/water system in classic sources such as International Critical Tables and other older compilations. For example, Watts, "A Dictionary of Chemistry and the Allied Branches of Other Sciences, 1879, teaches that acid lithium sulphate, $LiHSO_4$, crystallises in prisms from a solution of the normal salt in sulphuric acid of sp. gr. 1.6 to 1.7; from more dilute acid, the normal salt separates again; and the acid salt melts at 160°. For example, Critical Tables contains data on the lithium sulphate/water binary. (Volume 4, p 42., 1928). Dortmund Data Bank also has some data on bisulfate.

However, there remains a need for providing an alternative to the existing processes for treating solutions comprising lithium sulfate and sulfuric acid.

SUMMARY

According to an aspect of the present disclosure, there is provided a process for treating an aqueous composition comprising lithium sulfate and sulfuric acid, said process comprising:

treating the aqueous composition comprising lithium sulfate and sulfuric acid under conditions to obtain crystals of lithium sulfate monohydrate and a lithium sulfate-reduced solution; and optionally separating the crystals of the lithium sulfate monohydrate from the lithium sulfate-reduced solution.

According to another aspect of the present disclosure, there is provided a process for treating an aqueous composition comprising lithium sulfate and sulfuric acid, said process comprising:

evaporatively crystallizing the aqueous composition comprising lithium sulfate and sulfuric acid under conditions to obtain crystals of lithium sulfate monohydrate and a lithium sulfate-reduced solution; and optionally separating the crystals of the lithium sulfate monohydrate from the lithium sulfate-reduced solution.

According to another aspect of the present disclosure, there is provided a process for treating an aqueous composition comprising lithium sulfate and sulfuric acid, said process comprising:

evaporatively crystallizing the aqueous composition comprising lithium sulfate and sulfuric acid under conditions to obtain crystals of lithium sulfate monohydrate and a lithium sulfate-reduced solution; and separating the crystals of the lithium sulfate monohydrate from the lithium sulfate-reduced solution.

BRIEF DESCRIPTION OF THE DRAWINGS

In the following drawings, which represent by way of example only, various embodiments of the disclosure:

FIG. 13E shows a photograph of 96 wt % total acid and salts concentrate at temperature according to comparative example BPR-2 of the present disclosure;

Figure 14A:
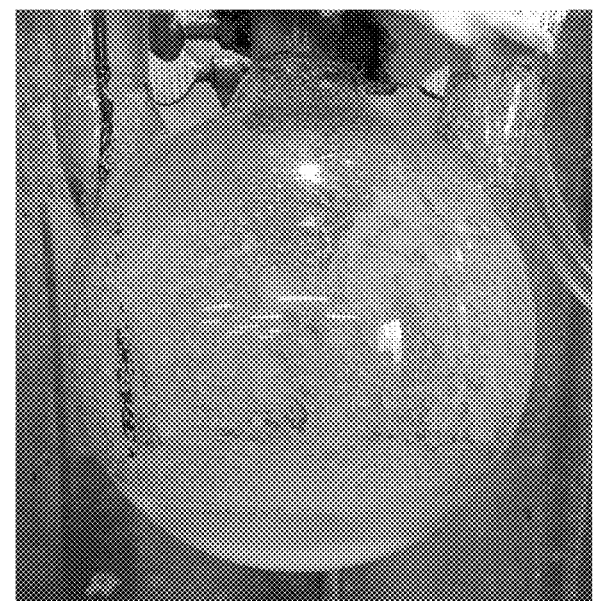
Figure 14B:
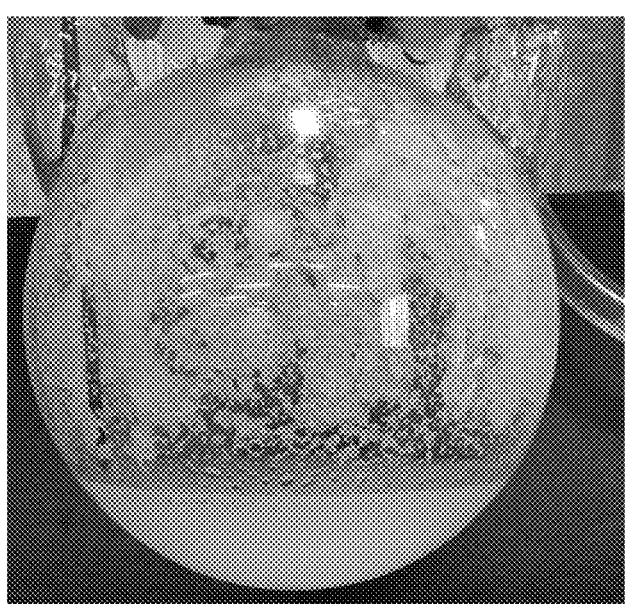
Figure 14C:
Figure 14D:
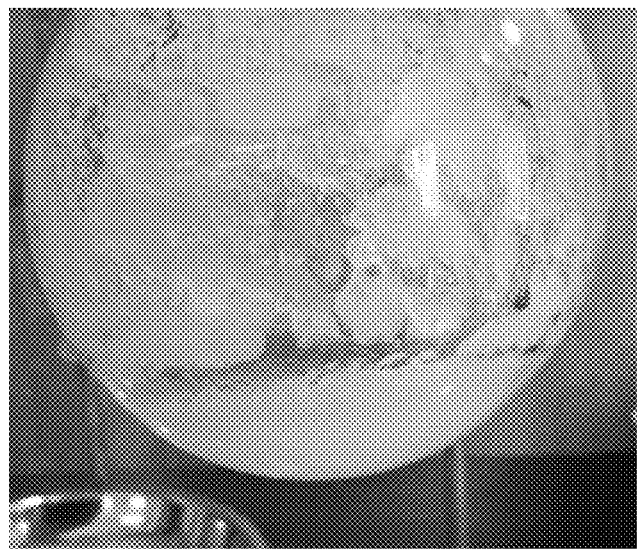
Figure 15A:
Figure 15B:
Figure 15C:
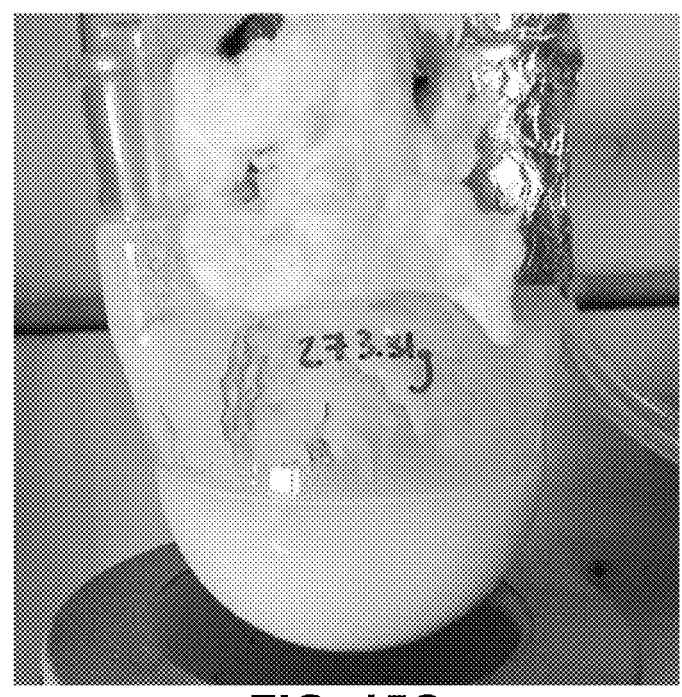
Figure 15D:
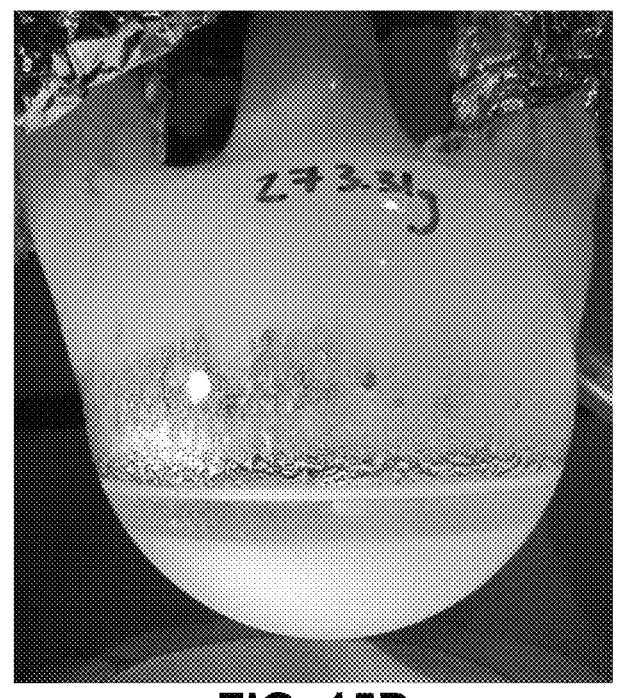
Figure 15E:
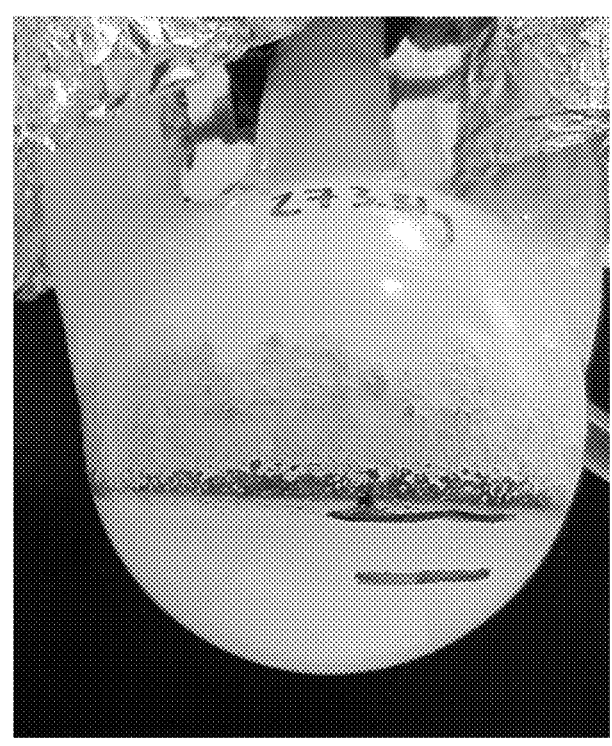
Figure 15F:
Figure 16A:
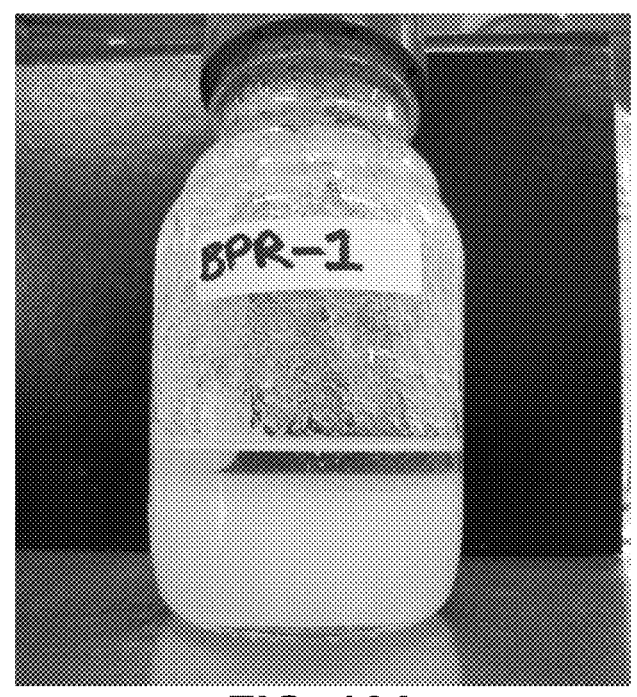
Figure 16B:
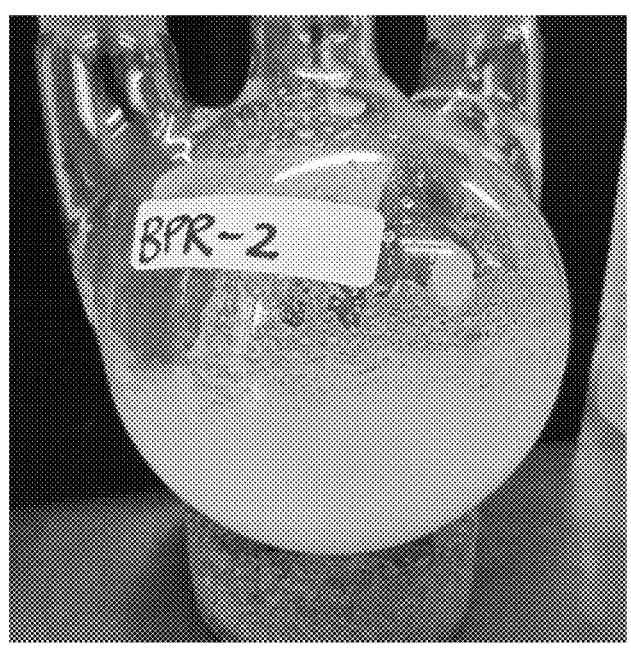
Figure 16C:
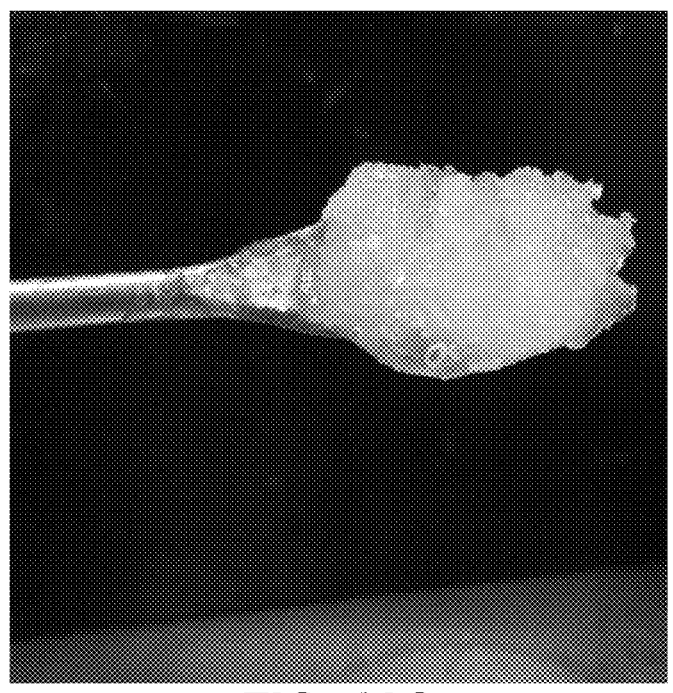
Figure 16D:
Figure 16E:
Figure 16F:
Figure 17A:
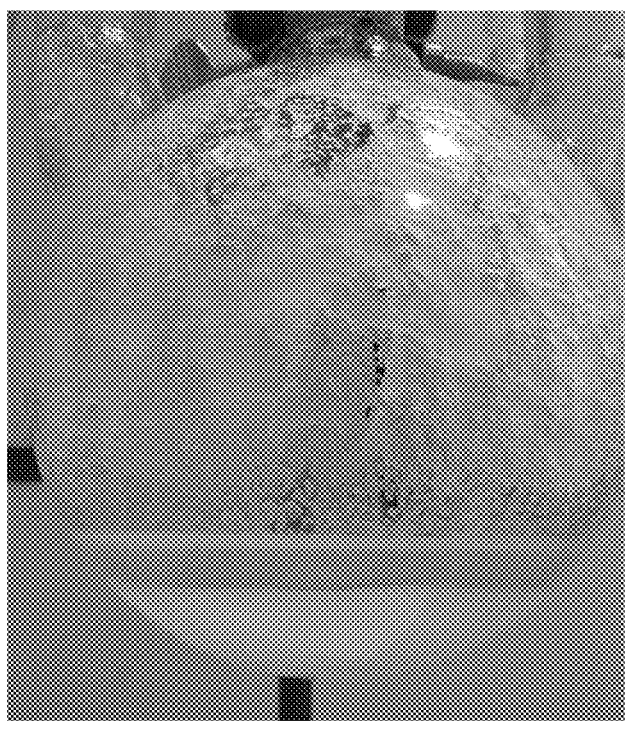
Figure 17B:
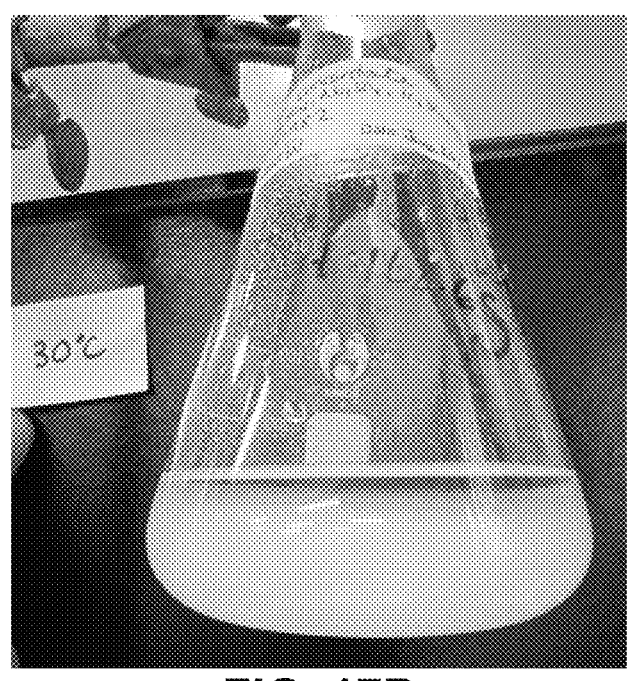
Figure 17C:
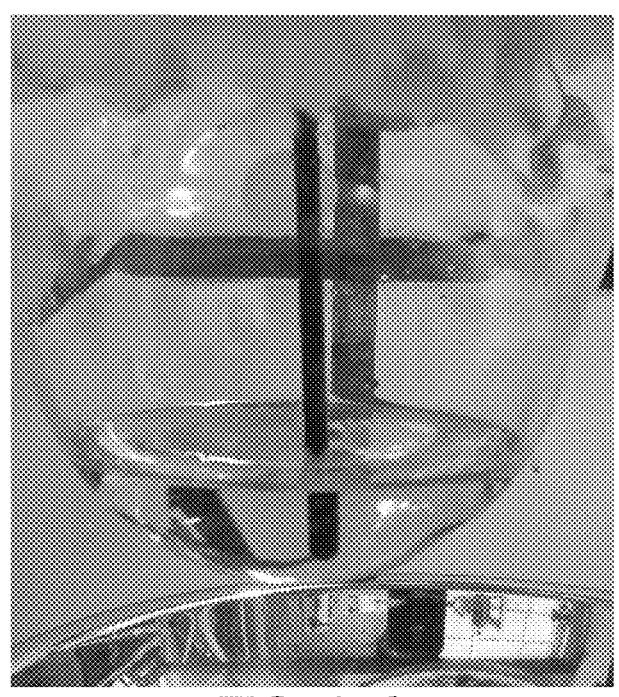
Figure 17D:
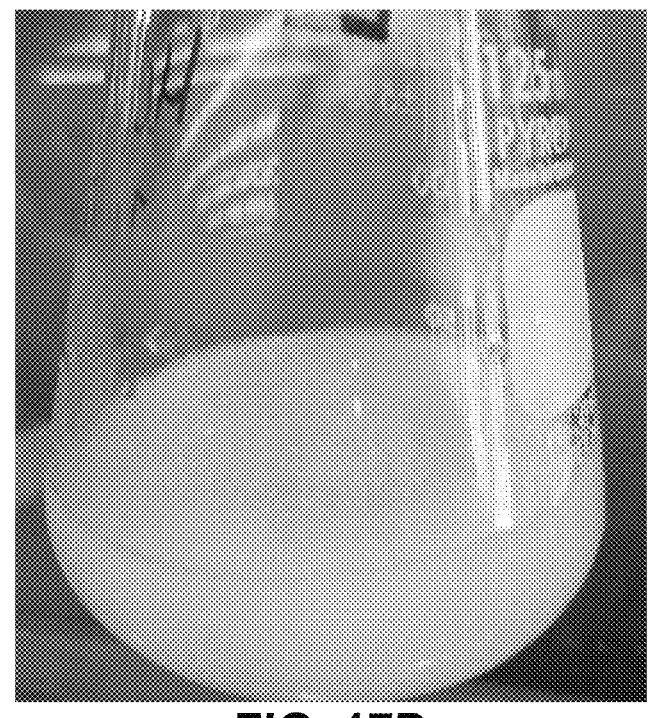
Figure 18A:
Figure 18B:
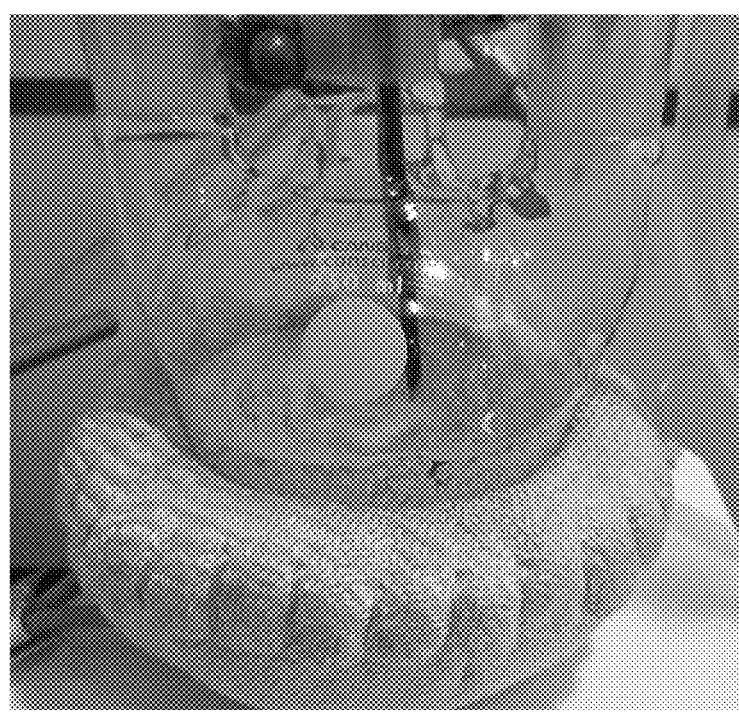
Figure 18C:
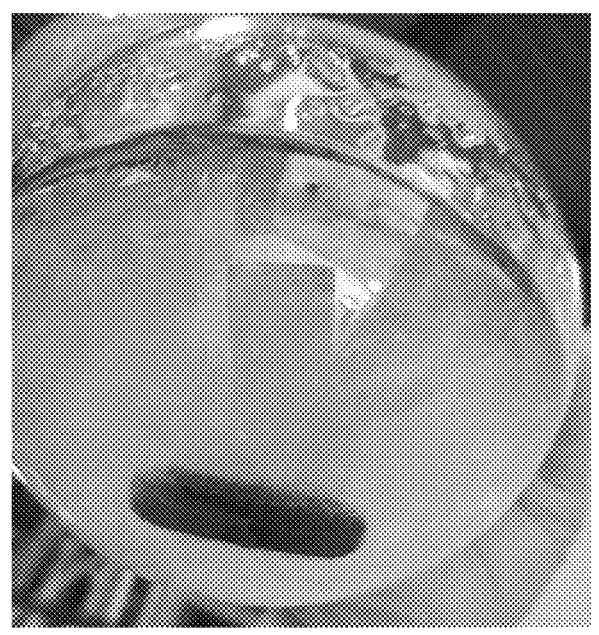
Figure 18D:
Figure 18E:
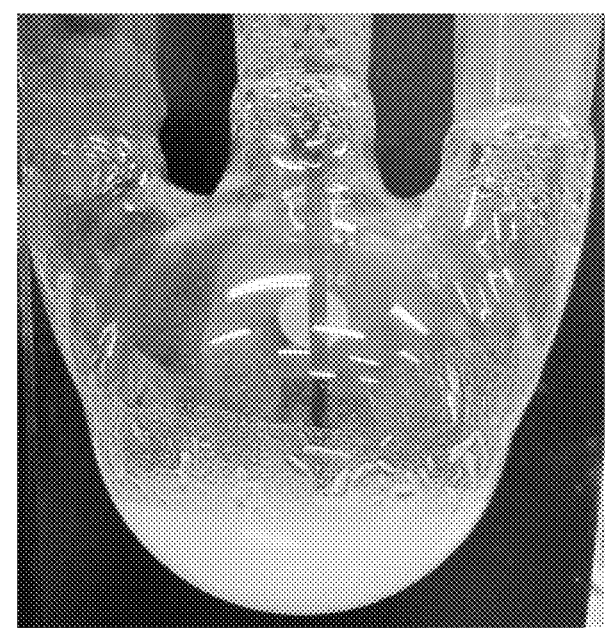
Figure 18F:
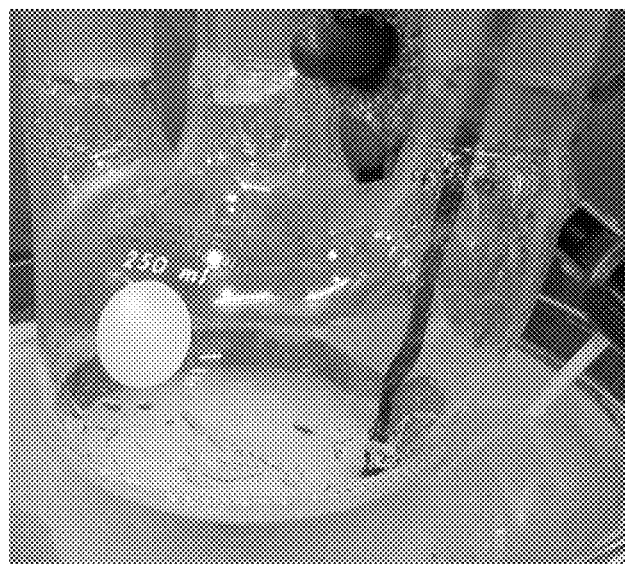

FIG. 14A shows a photograph of 66 wt % total acid and salts concentrate at temperature; FIG. 14B shows a photograph of 66 wt % total acid and salts concentrate at room temperature; FIG. 14C shows a photograph of 83 wt % total acid and salts concentrate at temperature; and FIG. 14D shows a photograph of 83 wt % total acid and salts concentrate at room temperature according to comparative example BPR-3 of the present disclosure;

FIG. 15A shows a photograph of solution 2 under vacuum, degassing; FIG. 15B shows a photograph of solution 2 heating under vacuum;

FIG. 15C shows a photograph of 69 wt % total acid and salts concentrate at temperature; FIG. 15D shows a photograph of 88 wt % total acid and salts concentrate at temperature; FIG. 15E shows a photograph of 88 wt % total acid and salts concentrate at room temperature; and FIG. 15F shows a photograph of 96 wt % total acid and salts concentrate at temperature according to comparative example BPR-4 of the present disclosure;

FIG. 16A shows a photographs of the final concentrates of BPR-1; FIGS. 16B and 16C show photographs of the final concentrates of BPR-2;

FIG. 16D shows a photograph of the final concentrates of BPR-3; FIG. 16E shows a photograph of the final concentrates of BPR-4; and FIG. 16F shows a photograph of the final concentrates of BPR-2 (right) and BPR-4 (left) according to comparative examples of the present disclosure;

FIG. 17A shows a photograph of the final concentrate of stage 1 at temperature; FIG. 17B shows a photograph of the final concentrate of stage 1 cooled to 30° C.; FIG. 17C shows a photograph of final concentrate of stage 2 at temperature; and FIG. 17D shows a photograph of final concentrate of stage 2 at 30° C. according to an example of a process of the present disclosure; and FIG. 18A shows a photograph of the hot 70% concentrate of stage 1; FIG. 18B shows a photograph of the initial concentrate of stage 2; FIGS. 18C and D show photographs of large crystals in the concentrate of stage 2 after crystallizing at 30° C. overnight; FIG. 18E shows a photograph of concentrate of stage 2 after additional day at 30° C.; and FIG. 18F shows a photograph of concentrate of stage 2 re-heated to 99° C. according to an example of a process of the present disclosure.

DETAILED DESCRIPTION

I. Definitions

Unless otherwise indicated, the definitions and examples described herein are intended to be applicable to all embodiments and aspects of the present disclosure herein described for which they are suitable as would be understood by a person skilled in the art.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

As used in this disclosure, the singular forms "a", "an" and "the" include plural references unless the content clearly dictates otherwise. In examples comprising an "additional" or "second" component, the second component as used herein is different from the other components or first component. A "third" component is different from the other, first, and second components, and further enumerated or "additional" components are similarly different.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "electromembrane process" as used herein refers, for example to a process that uses ion-exchange membrane(s) and an electric potential difference as the driving force for ionic species. The electromembrane process can be, for example (a membrane) electrodialysis or (a membrane) electrolysis. For example, the electromembrane process can be a membrane electrolysis.

II. Processes

The below presented examples are non-limitative and are used to better exemplify the processes of the present disclosure.

In the processes for treating an aqueous composition comprising lithium sulfate and sulfuric acid of the present disclosure, the aqueous composition can have any suitable concentration of lithium sulfate and sulfuric acid. For example, the aqueous composition comprising lithium sulfate and sulfuric acid can comprise from about 1 wt % to about 40 wt %, about 1 wt % to about 35 wt %, about 10 wt % to about 30 wt %, about 10 wt % to about 35 wt %, about 10 wt % to about 25 wt %, about 15 wt % to about 25 wt %, about 15 wt % to about 30 wt %, about 15 wt % to about 35 wt %, about 18 wt % to about 22 wt % or about 20 wt % lithium sulfate, based on the total weight of the aqueous composition. For example, the aqueous composition comprising lithium sulfate and sulfuric acid can comprise from about 1 wt % to about 25 wt %, about 1 wt % to about 20 wt %, about 5 wt % to about 20 wt %, about 10 wt % to about 25 wt %, about 1 wt % to about 15 wt %, about 7 wt % to about 15 wt %, about 10 wt % to about 20 wt %, or about 12 wt % sulfuric acid, based on the total weight of the aqueous composition.

The aqueous composition comprising lithium sulfate and sulfuric acid can optionally further comprise other suitable sulfates such as other alkali metal sulfates e.g. sodium sulfate and/or potassium sulfate. For example, the aqueous composition comprising lithium sulfate and sulfuric acid can further comprise sodium sulfate in an amount of up to about 10 wt %, for example from about 0.1 wt % to about 5 wt %, about 1 wt % to about 5 wt %, about 2 wt % to about 8 wt %, about 2 wt % to about 5 wt %, about 0.25 wt % to about 2.5 wt %, about 0.5 wt % to about 2 wt %, about 0.5 wt % to about 1.5 wt %, or about 1.3 wt %, based on the total weight of the aqueous composition. For example, the aqueous composition comprising lithium sulfate and sulfuric acid can further comprise potassium sulfate in an amount of up to about 10 wt %, for example from about 0.1 wt % to about 5 wt %, about 1 wt % to about 5 wt %, about 2 wt % to about 8 wt %, about 2 wt % to about 5 wt %, about 0.25 wt % to about 2.5 wt %, about 0.5 wt % to about 2 wt %, about 0.5 wt % to about 1.5 wt %, or about 1.3 wt %, based on the total weight of the aqueous composition. For example, the aqueous composition comprising lithium sulfate and sulfuric acid can further comprise sodium sulfate and/or potassium sulfate in an amount of up to about 10 wt %, for example from about 0.1 wt % to about 5 wt %, about 1 wt % to about 5 wt %, about 2 wt % to about 8 wt %, about 2 wt % to about 5 wt %, about 0.25 wt % to about 2.5 wt %, about 0.5 wt % to about 2 wt %, about 0.5 wt % to about 1.5 wt %, or about 1.3 wt %, based on the total weight of the aqueous composition.

For example, the aqueous composition comprising lithium sulfate and sulfuric acid can be from an electromembrane process for preparing lithium hydroxide. Exemplary flow diagrams for two examples of such electromembrane processes are shown in FIGS. 1 and 2.

Figure 1:
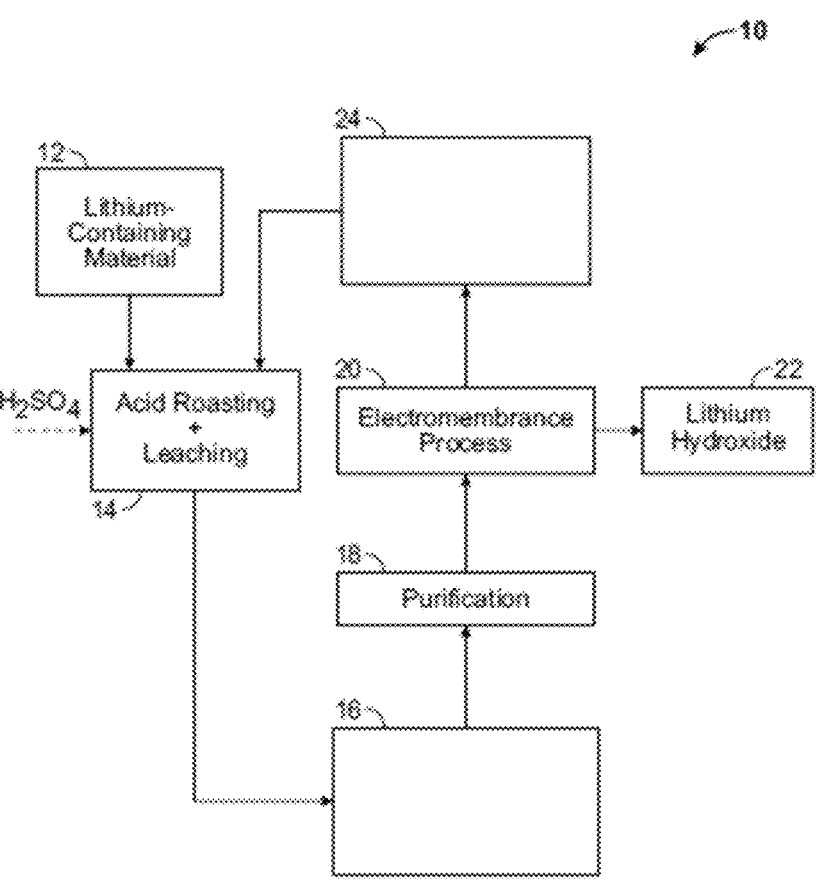
FIG. 1 is a schematic diagram of a process according to an example of the present disclosure.

Referring to FIG. 1, the process 10 exemplified therein is for preparing lithium hydroxide. In the process exemplified therein, a lithium-containing material 12 such as a lithium-containing ore such as β-spodumene is subjected to acid roasting and leaching steps 14 under suitable conditions to obtain an aqueous composition comprising lithium sulfate. The aqueous composition comprising lithium sulfate 16 can then be purified 18, for example to remove at least a portion of a metal impurity or a non-metallic impurity (for example Si and derivatives thereof) that has leached into the aqueous composition comprising lithium sulfate 16. For example, purification 18 can be carried out as described in PCT Application WO 2013/159194 entitled "Processes for preparing lithium hydroxide". The aqueous composition comprising lithium sulfate then can be submitted to an electromembrane process 20 (such as a two-compartment monopolar or bipolar membrane electrolysis process, a three-compartment monopolar or bipolar membrane electrolysis process, or a combination of a two-compartment monopolar or bipolar membrane electrolysis process and a three-compartment monopolar or bipolar membrane electrolysis process) under suitable conditions for at least partial conversion of the lithium sulfate into lithium hydroxide 22 and to obtain an acidic lithium sulfate solution 24. For example, the acidic lithium sulfate solution 24 of process 10 of FIG. 1 can be the aqueous composition comprising lithium sulfate and sulfuric acid which is treated in the processes of the present disclosure.

Figure 2:
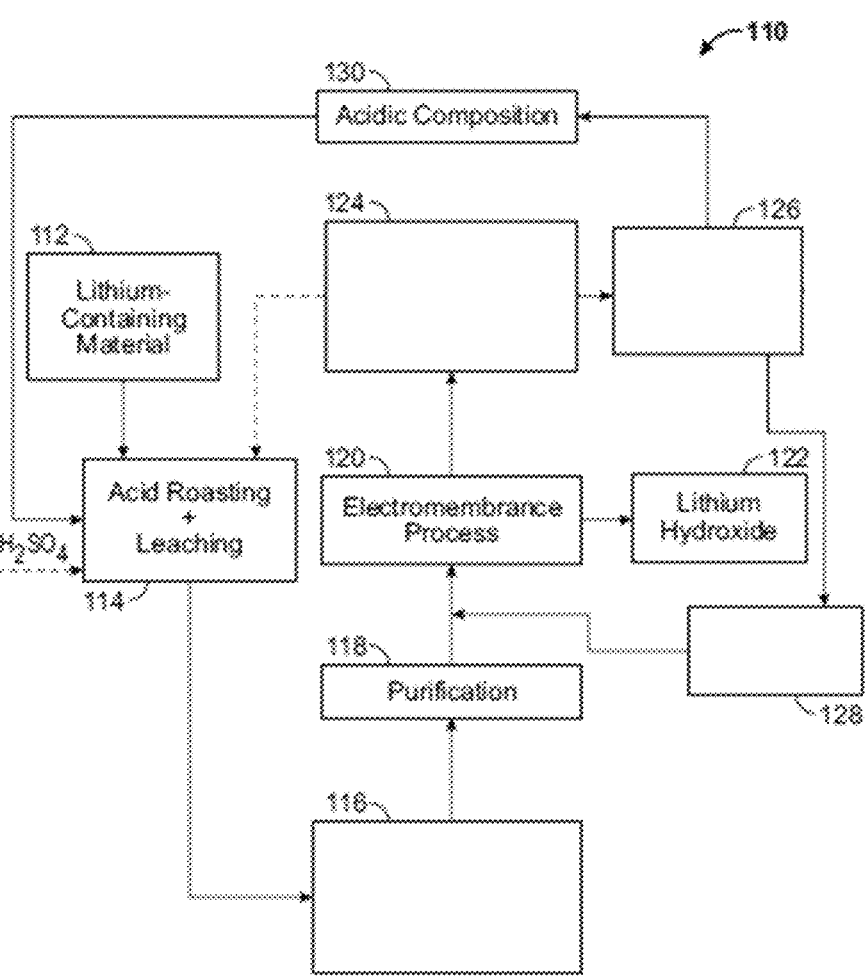
FIG. 2 is a schematic diagram of a process according to another example of the present disclosure.

Referring to FIG. 2, the process 110 exemplified therein is for preparing lithium hydroxide and is similar to the process 10 exemplified in FIG. 1. Several steps in the method of FIGS. 2 (112, 114, 116, 118, 120, 122 and 124) are similar to those found in the process of FIGS. 1 (12, 14, 16, 18, 20, 22 and 24). With respect to the separation step 126, such step was found to be an alternative instead of simply reusing the acidic lithium sulfate solution 124 into the acid roasting step 114 (see the dotted line between step 124 and 114). In separation step 126, water is removed in order to obtain a more concentrated acidic composition 130. It was found that such a more concentrated acidic composition that comprises sulfuric acid was efficient to carry out the acid roasting step in 114. For example, the acidic lithium sulfate solution 124 of process 110 of FIG. 2 can be the aqueous composition comprising lithium sulfate and sulfuric acid which is treated in the processes of the present disclosure. Accordingly, separation step 126 can comprise a process of the present disclosure whereby a more concentrated acidic composition 130 can be obtained which can be recycled back into the acid roasting step 114 as well as crystals of lithium sulfate monohydrate 128 recovered. The recovered lithium sulfate monohydrate can optionally be reused in electromembrane process 120.

The conditions for at least partial conversion of the lithium sulfate into lithium hydroxide may vary, and the selection of suitable conditions can be made by a person skilled in the art in light of their common general knowledge and with reference to the present disclosure. For example, processes for preparing lithium hydroxide comprising submitting a composition comprising a lithium compound to an electromembrane process are disclosed in PCT Application WO 2014/138933 entitled "Processes for preparing lithium hydroxide"; PCT Application No. WO/2015/058288 entitled "Processes and systems for preparing lithium hydroxide"; and PCT Application WO 2013/159194 entitled "Processes for preparing lithium hydroxide"

In the studies of the present disclosure, it was observed that the use of lower temperatures as a result of using vacuum in the processes helped to prevent the decomposition of the lithium sulfate monohydrate and therefore may be beneficial for recovery. Accordingly, the processes of the present disclosure can be carried out under conditions whereby decomposition of lithium sulfate monohydrate can be inhibited, for example, decomposition of the lithium sulfate monohydrate can be at least substantially prevented.

For example, the conditions to obtain crystals of the lithium sulfate monohydrate and lithium sulfate-reduced solution can comprise evaporatively crystallizing the aqueous composition comprising lithium sulfate and sulfuric acid at a temperature of less than 140° C., 130° C. or 100° C. For example, the evaporative crystallization can be carried out at a temperature of from about 40° C. to 140° C., about 40° C. to 130° C., about 45° C. to 125° C., about 50° C. to 120° C., about 50° C. to 110° C., about 50° C. to 100° C., about 40° C. to about 95° C., about 45° C. to about 85° C., about 50° C. to about 85° C., about 60° C. to about 90° C., about 60° C. to about 95° C., about 75° C. to about 85° C. or about 82° C. For example, the conditions to obtain crystals of the lithium sulfate monohydrate and lithium sulfate-reduced solution can further comprise evaporatively crystallizing the aqueous composition comprising lithium sulfate and sulfuric acid at a pressure that is lower than atmospheric pressure. For example, the evaporative crystallization can be carried out at a pressure of from about 1 kPa to about 100 kPa, 1 kPa to about 90 kPa, about 1 kPa to about 75 kPa, about 1 kPa to about 50 kPa, 5 kPa to about 75 kPa, about 1 kPa to about 25 kPa, about 1 kPa to about 20 kPa, about 5 kPa to about 15 kPa, about 10 kPa to about 25 kPa, about 15 kPa to about 20 kPa or about 16 kPa. For example, the evaporative crystallization can also be carried out at atmospheric pressure. For example, the evaporative crystallization can be carried out at a pressure of about 95 to 105 kPa, about 98 to 105 kPa or about 98 to 104 kPa.

The results of the studies of the present disclosure, suggest, while not wishing to be limited by theory, that it would be impractical to concentrate a solution such as an anolyte solution directly to a high concentration of acid and salts because the viscous gel-like nature of the mixture would most likely be prone to freezing/plugging of equipment and piping and be difficult to handle. Accordingly, in the processes of the present disclosure, lithium sulphate monohydrate crystals are removed at a suitable intermediate concentration.

For example, the conditions to obtain crystals of the lithium sulfate monohydrate and lithium sulfate-reduced solution further comprise evaporatively crystallizing the aqueous composition comprising lithium sulfate and sulfuric acid for a time in which the lithium sulfate-reduced solution contains a concentration of sulfuric acid that is less than about 65 wt %, based on the total weight of the lithium sulfate-reduced solution. For example, the evaporative crystallization can be carried out until the lithium sulfate-reduced solution has a sulfuric acid concentration of from about 30 wt % to about 65 wt %, about 30 wt % to about 50 wt %, about 40 wt % to about 65 wt %, about 40 wt % to about 50 wt %, about 45 wt % to about 65 wt %, about 45 wt % to about 60 wt %, about 50 wt % to about 65 wt %, about 45 wt % to about 55 wt %, about 40 wt % to about 60 wt %, or about 48 wt %, based on the total weight of the lithium sulfate-reduced solution.

The evaporative crystallizer can be any suitable evaporative crystallizer, the selection of which can be made by a person skilled in the art. For example, the evaporative crystallization can be carried out using a single effect evaporative crystallizer. For example, the evaporative crystallization can alternatively be carried out using a multiple effect evaporative crystallizer. For example, the evaporative crystallization can be carried out using a vapour recompression evaporator, for example, in which vapour from one effect can be used to evaporate further vapour in either a different effect, or in the same effect by either operating an additional effect at a different pressure, or compressing the vapour and recondensing in a steam chest in the same effect.

For example, the process can comprise:

cooling the lithium sulfate-reduced solution under conditions to obtain a further portion of crystals of lithium sulfate monohydrate and a lithium sulfate-further reduced solution comprising sulfuric acid; and separating the crystals of lithium sulfate monohydrate from the lithium sulfate-further reduced solution comprising sulfuric acid.

For example, the process can comprise:

cooling the crystals of lithium sulfate monohydrate and the lithium sulfate-reduced solution under conditions to obtain a further portion of crystals of lithium sulfate monohydrate and a lithium sulfate-further reduced solution comprising sulfuric acid; and separating the crystals of lithium sulfate monohydrate from the lithium sulfate-further reduced solution comprising sulfuric acid.

For example, the cooling of the lithium sulfate-reduced solution and optionally the crystals of lithium sulfate monohydrate can be carried out at a temperature of from about 15° C. to about 80° C., about 20° C. to about 60° C., about 25° C. to about 40° C., about 25° C. to about 35° C. or about 30° C. For example, the cooling can be carried out at a pressure that is from about 1 kPa to about 100 kPa, 10 kPa to about 100 kPa, 1 kPa to about 50 kPa, 1 kPa to about 30 kPa, 1 kPa to about 20 kPa, about 0.5 kPa to about 25 kPa, about 0.5 kPa to about 20 kPa, about 1 kPa to about 10 kPa, about 1 kPa to about 5 kPa, about 0.5 kPa to about 5 kPa or about 2 kPa. For example, the cooling can also be carried out at atmospheric pressure. For example, the cooling can be carried out at a pressure of about 95 to 105 kPa, about 98 to 105 kPa or about 98 to 104 kPa In examples of the processes of the present disclosure wherein the crystals of the lithium sulfate monohydrate are separated from the lithium sulfate-reduced solution, the separation can be carried out by any suitable means for liquid/solid separation, the selection of which can be made by a person skilled in the art. For example, the separation can comprise gravity thickening, hydrocyclones, filtration, centrifugation or combinations thereof. For example, the separation can comprise filtering a mixture of the crystals of lithium sulfate monohydrate and the lithium sulfate-reduced solution.

For example, the process can further comprise mechanically separating the lithium sulfate monohydrate from entrained lithium sulfate-reduced solution. For example, the process can further comprise washing the crystals of the lithium sulfate monohydrate. Suitable means and conditions for mechanical separation and washing can be selected by a person skilled in the art.

The results of the studies of the present disclosure, also suggest, while not wishing to be limited by theory, that while it would be impractical to concentrate a solution such as an anolyte solution directly to a high concentration, such a concentration can be carried out subsequent to the removal of lithium sulphate monohydrate crystals at the suitable intermediate concentration.

For example, the process can further comprise concentrating the lithium sulfate-reduced solution under conditions to obtain an acidic condensate and a concentrate comprising sulfuric acid.

For example, the conditions to obtain the acidic condensate and the concentrate comprising sulfuric acid can comprise concentrating the lithium sulfate-reduced solution at a temperature of from about 50° C. to about 250° C., about 50° C. to about 200° C., about 75° C. to about 200° C., about 100° C. to about 250° C., about 125° C. to about 250° C., about 100° C. to about 200° C., about 125° C. to about 225° C., about 150° C. to about 250° C., about 170° C. to about 225° C., about 170° C. to about 200° C., about 170° C. to about 190° C., about 175° C. to about 195° C., about 170° C. to about 180° C., about 180° C. to about 190° C., about 170° C., about 180° C. or about 190° C.

For example, the conditions to obtain the acidic condensate and the concentrate comprising sulfuric acid can further comprise concentrating the lithium sulfate-reduced solution at a pressure that is lower than atmospheric pressure. For example, the concentrating can be carried out at a pressure that is from about 1 kPa to about 100 kPa, 10 kPa to about 100 kPa, 1 kPa to about 50 kPa, 1 kPa to about 30 kPa, 1 kPa to about 20 kPa, about 0.5 kPa to about 25 kPa, about 0.5 kPa to about 20 kPa, about 1 kPa to about 10 kPa, about 1 kPa to about 5 kPa, about 0.5 kPa to about 5 kPa or about 2 kPa. For example, the concentrating can also be carried out at atmospheric pressure. For example, the concentrating can be carried out at a pressure of about 95 to 105 kPa, about 98 to 105 kPa or about 98 to 104 kPa.

For example, the conditions to obtain the acidic condensate and the concentrate comprising sulfuric acid can further comprise concentrating the lithium sulfate-reduced solution until a total concentration of sulfuric acid, lithium sulfate and optionally sodium sulfate of greater than about 65 wt %, for example, about 65 wt % to about 99 wt %, about 85 wt % to about 98 wt %, about 75 wt % to about 95 wt %, about 90 wt % to about 98 wt %, about 80 wt % to about 98 wt %, about 90 wt % to about 97 wt %, about 91 wt % to about 95 wt % or about 96 wt % in the concentrate comprising sulfuric acid can be reached, based on the total weight of the concentrate.

For example, the concentrate comprising sulfuric acid can be recycled to an electromembrane process for preparing lithium hydroxide. Exemplary flow diagrams for two examples of such electromembrane processes are shown in FIGS. 1 and 2 and described hereinabove.

For example, the concentrate comprising sulfuric acid can be recycled to a process step (e.g. FIG. 1: 14; FIG. 2: 114) comprising leaching a lithium-containing material with the concentrate comprising sulfuric acid. The selection of suitable conditions for such a process step can be made by a person skilled in the art. For example, processes comprising roasting a lithium-containing material with an acid are disclosed in PCT Application WO 2013/159194 entitled "Processes for preparing lithium hydroxide".

For example, the lithium-containing material is leached with the concentrate that can be at a temperature of about 100° C. to about 170° C., about 100° C. to about 160° C., about 100° C. to about 150° C., less than about 170° C. or less than about 160° C.

For example, the lithium-containing material can be a lithium-containing ore. For example, the lithium-containing ore can comprise, consist essentially of or consist of α-spodumene, β-spodumene, lepidolite, pegmatite, petalite, eucryptite, amblygonite, hectorite, smectite, jadarite, a clay or mixtures thereof. For example, the lithium-containing ore can comprise, consist essentially of or consist of β-spodumene, jadarite or mixtures thereof. For example, the lithium-containing ore can comprise, consist essentially of or consist of β-spodumene. For example, the lithium-containing ore can be β-spodumene.

For example, the concentrate comprising sulfuric acid can be recycled to the electromembrane process for preparing lithium hydroxide without further crystallization to obtain a further portion of crystals of lithium sulfate monohydrate. Alternatively, the process can further comprise:

cooling the concentrate comprising sulfuric acid under conditions to obtain a further portion of crystals of lithium sulfate monohydrate and a lithium sulfate-reduced concentrate comprising sulfuric acid; and separating the crystals of the further portion of lithium sulfate monohydrate from the lithium sulfate-reduced concentrate comprising sulfuric acid.

For example, the conditions to obtain the further portion of crystals of lithium sulfate monohydrate and the lithium sulfate-reduced concentrate comprising sulfuric acid can comprise cooling the concentrate to a temperature of from about 5° C. to about 170° C., about 5° C. to about 150° C., about 5° C. to about 130° C., about 20° C. to about 130° C., about 15° C. to about 130° C., about 15° C. to about 50° C., about 25° C. to about 75° C., about 25° C. to about 35° C. or about 30° C. For example, the conditions to obtain the further portion of crystals lithium sulfate monohydrate and the lithium sulfate-reduced concentrate comprising sulfuric acid can comprise carrying out the cooling a pressure that is lower than atmospheric pressure. For example, the cooling can be carried out at a pressure that is from about 1 kPa to about 100 kPa, 10 kPa to about 100 kPa, 1 kPa to about 50 kPa, 1 kPa to about 30 kPa, 1 kPa to about 20 kPa, about 0.5 kPa to about 25 kPa, about 0.5 kPa to about 20 kPa, about 1 kPa to about 10 kPa, about 1 kPa to about 5 kPa, about 0.5 kPa to about 5 kPa or about 2 kPa. For example, the cooling can also be carried out at atmospheric pressure. For example, the cooling can be carried out at a pressure of about 95 to 105 kPa, about 98 to 105 kPa or about 98 to 104 kPa.

For example, the process can further comprise mechanically separating the further portion of lithium sulfate monohydrate from entrained lithium sulfate-reduced concentrate comprising sulfuric acid. For example, the process can further comprise washing the crystals of the further portion of lithium sulfate monohydrate with water. Suitable means and conditions for mechanical separation and washing can be selected by a person skilled in the art.

The following non-limiting examples are illustrative of the present disclosure:

EXAMPLES

Example 1: Crystallization of Lithium Sulphate Monohydrate Crystals from Lithium Sulphate/Sulphuric Acid Solutions An objective of the present example was to study at what points in an evaporation different forms of crystal, with different filtration characteristics, would be produced and to study how the system would behave under vacuum.

An existing process to produce lithium hydroxide from spodumene includes a step in which "concentrated" sulphuric acid is reacted with β-spodumene. The "roasting" reaction occurs in a modest temperature pug mill (200-300° C.) and produces a solid from which lithium sulphate can be extracted by leaching into water. The extent of the conversion of lithium oxide in the spodumene to sulphate has been shown to depend strongly upon the acid strength used in the roast, which may advantageously be greater than approximately 90%.

After purification, to remove, for example silica and other elements which would be deleterious to the downstream lithium hydroxide recovery, the lithium sulphate solution from the leach is processed electrochemically in a salt splitting cell to produce lithium hydroxide and an acidic lithium sulphate solution.

As an alternative to continuously purging sulphuric acid as gypsum from the electrochemical process and continuously making up significant quantities of fresh sulphuric acid, an alternative is to recycle sulphuric acid re-generated in a downstream process to the electrochemical process.

The Examples of the present disclosure study the use of an evaporative crystallization process to recover unreacted lithium sulphate from the electrochemical process and recycle it, followed by a sulfuric acid reconcentration (SARC) process to remove water from sulphuric acid before it is recycled.

Criteria for the acid reconcentration are established, for example, by the need to provide a solution with less than approximately 10% water. It is also useful to understand the composition of the balance of the recycled acids, which will contain some dissolved lithium sulphate.

Accordingly, laboratory and pilot testing is pursued in support of a conceptual design of a sulphuric acid recycle system in which an initial sulphate crystallisation is followed by an acid re-concentration. The work is aimed, for example, at identifying how much water can be removed in each phase and the characteristics of the lithium sulphate crystallization and sulphuric acid/lithium sulphate re-concentration solutions.

Testing was conducted under vacuum in addition to atmospheric pressure as operation under vacuum may impact the form of the crystals produced. Both lithium sulphate monohydrate and the anhydrous form are known to exist, with the form, while not wishing to be limited by theory, believed to be dependent upon temperature and water content of the solution. The monohydrate, while not wishing to be limited by theory, is believed to be the more filterable of the two. Work under vacuum is advantageous, for example, because the re-concentration (SARC) step is advantageously operated under these conditions so as to allow an acceptable practical metallurgy.

The objective of the testing, which is the basis of Example, was, to perform some basic laboratory experiments to identify advantageous process conditions for crystallization of relatively easily recoverable lithium sulphate monohydrate crystals from lithium sulphate/sulphuric acid solutions. In addition to identifying such conditions for crystallization, the Example 1 testing was also intended, for example, to study the boiling point rise behaviour of sulphuric acid/lithium/sodium sulphate solutions. This is advantageous to the design of both the evaporative crystallization and SARC processes.

I. Introduction (a) $Li_2SO_4$/$H_2SO_4$/$H_2O$ Ternary Phase Diagram

Figure 3:
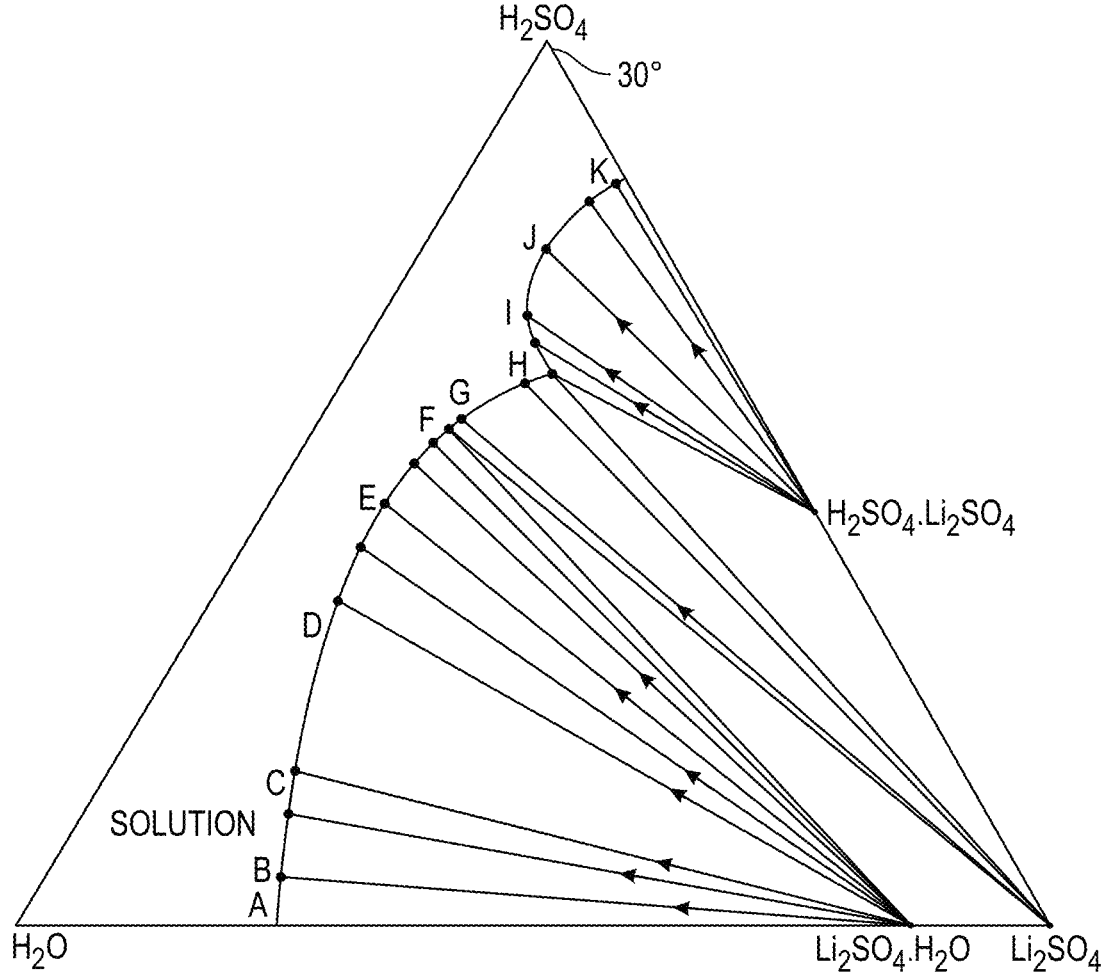
FIG. 3 shows a schematic of the ternary phase diagram for an example of the $Li_2SO_4/H_2SO_4/H_2O$ system at 30° C.

FIG. 3 shows an exemplary ternary phase diagram for the $Li_2SO_4$/$H_2SO_4$/$H_2O$ System at 30° C. (International Critical Tables of Numerical Data—Physics, Chemistry and Technology, Volume IV (1928) pages 353 & 391). Table 1 provides the equilibrium concentration data at 30° C. for points in FIG. 3.

TABLE 1

|   | | Liquid Phase | |
| --- | --- | --- | --- |
|   | Solid Phase | wt % $H_2SO_4$ | wt % $Li_2SO_4$ |
| A | $Li_2SO_4 \cdot H_2O$ | 0 | 25.10 |
| B | | 5.05 | 22.74 |
| C | | 16.6 | 19.10 |
| D | | 32.7 | 13.37 |
| E | | 48.0 | 10.20 |
| F | $Li_2SO_4 \cdot H_2O + Li_2SO_4$ | 55.00 | 13.00 |
| G | $Li_2SO_4$ | 56.30 | 13.87 |
| H | $Li_2SO_4 + Li_2SO_4 \cdot H_2SO_4$ | 62.40 | 18.50 |
| I | $Li_2SO_4 \cdot H_2SO_4$ | 69.40 | 13.75 |
| J | | 78.23 | 11.64 |
| K | | 83.43 | 15.65 |

The diagram in FIG. 3 shows the saturation conditions at varying acid concentrations at 30° C. This data was compared to recovery results of previous testing and found to agree within 5% accuracy. While not wishing to be limited by theory, the phase diagram of FIG. 3 shows that the maximum amount of lithium sulphate recovered at this temperature would be at a sulphuric acid concentration of 48 wt % (Point E). This gives the lowest solubility of lithium (10.2 wt %), while remaining in the zone where the monohydrate crystals are the stable form, which, from previous studies, has shown to provide the best separation. Higher concentrations will begin to re-dissolve the lithium and form anhydrous and subsequently bisulphate crystals. Once above a concentration of 69.4 wt % sulphuric acid, additional lithium can be recovered. However, it will be in the form of lithium bisulphate resulting in a loss of acid.

(b) Solubility

The solubility of lithium sulphate as a function of temperature has been disclosed for water. However, it is not well established in concentrations of sulphuric acid, with the exception of the 30° C. points discussed above.

For water, the solubility of lithium sulphate has an inverse behavior in the temperature range of interest; see e.g. Critical Tables, IV, p 233. Prior to the present study it was unclear whether this also applied to the solubility in sulphuric acid solutions, which would directly influence the design operating temperature of the crystallizing/separation unit. Accordingly, tests were performed to study this solubility/temperature relationship in sulphuric acid.

(c) Decomposition of Hydrate

The monohydrate form of lithium sulphate will decompose into the anhydrous form given enough energy:

$$Li_2SO_4 \cdot H_2O(s) \leftrightarrow Li_2SO_4(s) + H_2O(g)$$

Table 2 provides the decomposition conditions for lithium sulphate monohydrate (International Critical Tables of Numerical Data—Physics, Chemistry and Technology, Volume VII (1930) page 303).

TABLE 2

| T [K] | P [atm] |
| --- | --- |
| 333.1 | 0.029 |
| 353.1 | 0.080 |
| 373.1 | 0.242 |
| 381.1 | 0.347 |

Figure 4:
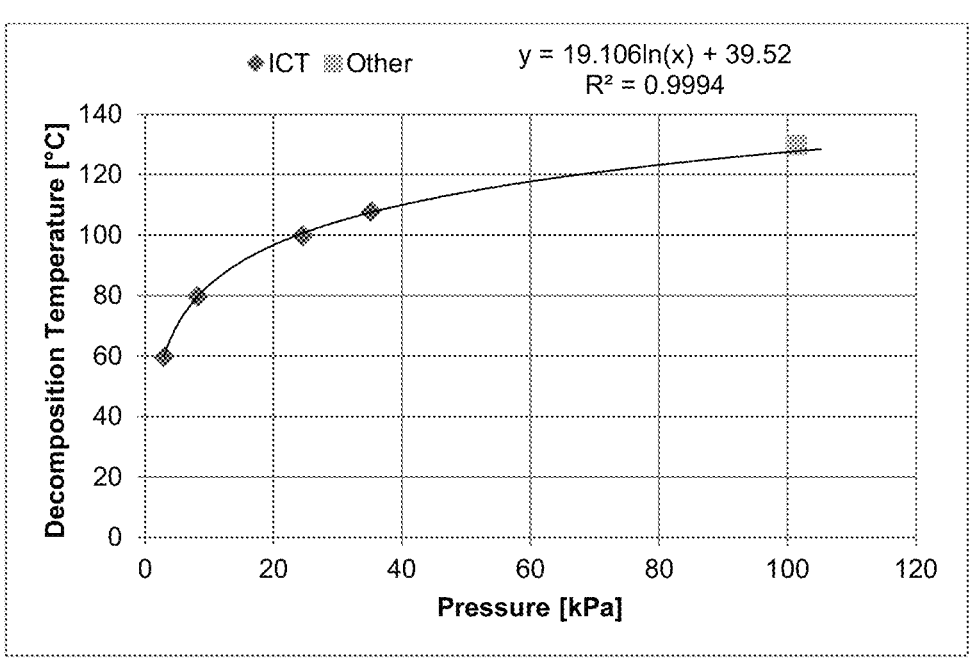
FIG. 4 is a plot of reported decomposition temperatures of the lithium sulphate monohydrate crystal as a function of pressure at boiling point.

Other sources are consistent in giving the decomposition temperature of the hydrate as 130° C., at atmospheric pressure. See FIG. 4 for reported decomposition temperatures as a function of pressure at boiling point.

While the decomposition temperature is related to the decomposition of the crystal in solution, these parameters are thermodynamically related and one can be calculated from the other. The relative locations of the boiling point curve and the decomposition curve indicate whether the hydrated crystal, or the anhydrate, is likely stable in solution at a given composition and temperature. The stable crystal form may then change as the solution is cooled after evaporation. This has not previously been investigated experimentally. For example, the boiling point curve is a function of sulphuric acid to lithium sulphate ratio and must be developed for a specific mixture.

II. Overview of Experimental (a) Solubility/Temperature Relationship Test

Lithium sulphate was slowly added to ~50 wt % sulphuric acid at 50° C. to determine the solubility at this concentration/temperature condition. This concentration was chosen to be close to conditions which can realistically be expected in the crystallizer step. The detailed procedure and results of this test can be found hereinbelow in Example 1, section IV.

The final composition of the saturated solution at 50° C. was determined to be:

| $H_2SO_4$ | 43.3 wt % |
| --- | --- |
| $H_2O$ | 43.4 wt % |
| $Li_2SO_4$ | 13.3 wt % |

The lithium solubility is higher at 50° C. than shown on the ternary phase diagram at 30° C. of FIG. 3 (13.3 wt % versus ~10.9 wt %). This indicates that unlike water, at this acid concentration the solubility is positively related to temperature (solubility increases as temperature increases). The solution was then heated to 70° C. and subsequently cooled to 30° C. to verify this phenomenon.

The data shows that at approximately 43 wt % sulphuric acid and between 30 and 50° C., the solubility of lithium drops by 0.12 wt % per ° C.

While not wishing to be limited by theory, this implies that it is better to operate the crystallization portion of the evaporative crystallizer step as cold as possible (within normal operating ranges available with cooling water) to maximize lithium sulphate recovery. However, the energy used to cool the solution and then reheat it for subsequent concentration may not justify colder crystallizer temperatures for example, from a cost and/or efficiency standpoint.

(b) Boiling Point Rise

Figure 5:
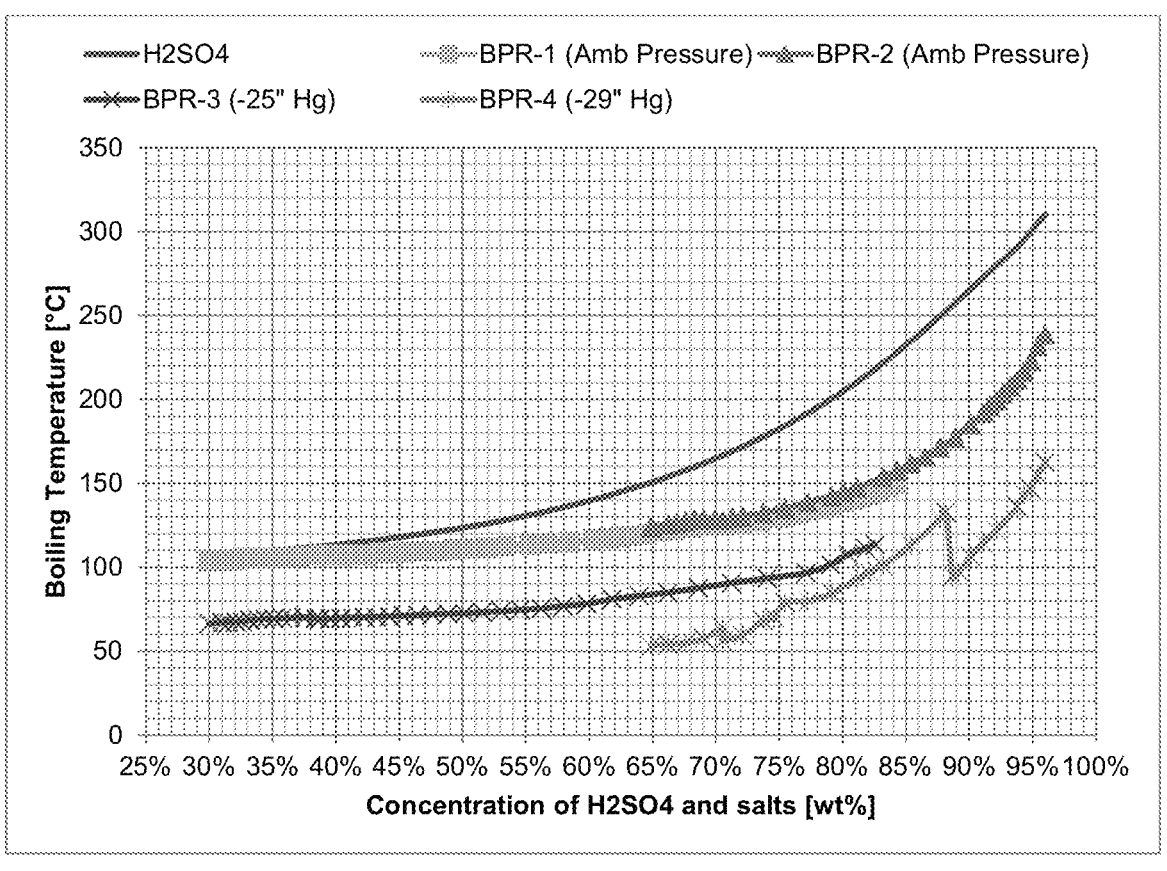
FIG. 5 is a plot showing the boiling temperatures of solutions of sulphuric acid, lithium and sodium sulphates as a function of concentration [wt %] according to an example of the present disclosure.

Varying concentrations of solutions were made up, based on the following lithium/sodium/sulphuric acid ratios: 19.5 wt % $Li_2SO_4$, 1.3 wt % $Na_2SO_4$, 12.2 wt % $H_2SO_4$ and 67.0 wt % $H_2O$; implies non-water portion of the solution to be 59.1 wt % $Li_2SO_4$, 3.9 wt % $Na_2SO_4$ and 37.0 wt % $H_2SO_4$. These solutions were then slowly boiled off and the condensate collected at varying pressures. The results of these tests are summarized in this section. The detailed procedure and results of these tests can be found hereinbelow in Example 1, section V. See also FIG. 5 for the boiling temperatures for each of these tests.

BPR-1 and BPR2: The first boiling point rise test (BPR-1) investigated a range from 30 wt % to 84 wt % sulphuric acid and salts and overlapped with the second test (BPR-2) which was from 65 wt % to 96 wt %. It was split up into two tests to ensure reproducibility and achieve a greater degree of accuracy especially at the higher concentration range. Both BPR-1 and BPR-2 were performed at ambient pressure. Crystallization was first observed at 107.8° C. and a composition of 14.9 wt % $H_2SO_4$ and 23.9 wt % $Li_2SO_4$, which gives another saturation point for this system. When it reached ~70 wt % (combined acid and salts) the mixture became very thick and had a large amount of solids. By the time it reached the final concentration of 96 wt % acid and salts, the mixture was very viscous and gel-like and difficult to manage.

BPR-3: The third boiling point rise test (BPR-3) investigated a range from 30 wt % to 83 wt % sulphuric acid and salts and was performed at –25" of Hg (16.7 kPa absolute). This was intended to match the boiling point rise that would be seen in an evaporative crystallization step operating under vacuum. Crystallization was first observed at 69.8° C. and a composition of 14.2 wt % $H_2SO_4$ and 22.7 wt % $Li_2SO_4$, another saturation point. By the time it reached a concentration of 51.5 wt % acid and salts, the mixture was a very thick slurry.

BPR-4: The fourth boiling point rise test (BPR-4) investigated a range from 65 wt % to 96 wt % sulphuric acid and salts and was performed at –29" of Hg (3.1 kPa absolute). This was intended to match the boiling point rise that would be seen in a SARC step which operates under deep vacuum. The data set from this test was corrupted by stopping overnight part-way through the run. Although this didn't seem to have an effect on previous tests, while not wishing to be limited by theory, it is believed that the high acid concentrations in combination with the low temperatures (i.e. below decomposition temperatures) may have caused the crystals to switch structures (i.e. bisulphate, sulphate or monohydrate) when cooled to room temperature and not reform to their previous structure when reheated to continue with the test. This would cause the solution composition and hence the boiling point to change. However, it is unlikely that in operation the anolyte solution would be concentrated entirely in a single stage without separating crystal due to its viscous nature making it difficult to handle.

(c) Evaporative Crystallizer/Filtration/Concentration Tests

From the above-described Boiling Point Rise experiments it was shown that it would be impractical from an industrial process standpoint to concentrate the anolyte solution directly to 96 wt % acid and salts without first removing crystals at some intermediate concentration. This was due to the viscous, gel-like nature of the mixture. Therefore a second set of tests was performed in which the anolyte first underwent a separate evaporative crystallization stage to concentrate to 71 wt % acid and salts.

The mixture was then cooled to 30° C. and the crystals were separated by filtration. The filtrate was then further concentrated under vacuum to a concentration of 96 wt % acid and salts in a final concentration stage.

This test was performed twice; once with the evaporative crystallizer running under vacuum and once at atmospheric pressure. In addition, a settling test was performed to quantify the settling characteristics of the monohydrate crystals. Lastly, a solids characterization test was conducted to attempt to determine the split fraction of lithium sulphate versus bisulphate crystal form. The results of all these tests are summarized in this section. The detailed procedure and results of these tests can be found in hereinbelow in Example 1, section VI.

Test 1: For this test the evaporative crystallizer was run at the same pressure as test BPR-3 (–25" of Hg). Approximately 81% of the salts were recovered from the simulated anolyte feed, following the initial concentration to 71 wt % acid and salts (stage 1). The crystals were needle-like and translucent, while not wishing to be limited by theory, indicating primarily the monohydrate form. An additional 2.5 to 5% of the salts were recovered following stage 2. It was not confirmed whether these crystals were in the sulphate or bisulphate form. While not wishing to be limited by theory, the expectation is that the majority will be as bisulphate, which will result in lower lithium recovery and higher acid losses. As the solution cooled, a crystallization temperature was not recorded; however it was believed to be approximately 130° C.

Test 2: For this test, the evaporative crystallizer was run at atmospheric pressure (same as BPR-1). Depending on the assumed form of the crystals (anhydrous vs monohydrate), 76 to 89% of the salts were recovered from the simulated anolyte feed, following the initial concentration to 71 wt % acid and salts (stage 1). The crystals were a mixture of translucent/needle-like and white powdery solids, while not wishing to be limited by theory, if the visual appearance is an accurate indicator of the form, the actual recovery is most likely somewhere in between these two limits. An additional 1.3 to 2.7% of the salts were recovered following stage 2. The uncertainty in percent recovery is due to whether the crystals are in the sulphate or bisulphate form. While not wishing to be limited by theory, the expectation is that the majority will be as bisulphate, which will result in lower lithium recovery and higher acid losses.

Settling Test: The settling test was performed on the concentrate from test 1 after the first concentration stage, after it had been cooled to 30° C. and before filtration. The test was done by agitating the mixture in a graduated cylinder and recording the solid level over time. The crystals settled relatively quickly and reached an equilibrium level after 10 to 20 minutes. However, it was found that the solids did not compact very well and only 30 mL of filtrate was recovered by separation. This was only ~22% of the filtrate, resulting in the crystals containing ~50 wt % filtrate. The filtrate can, for example, be recovered via some mechanical means (e.g. filter, centrifuge, etc.) to avoid large acid losses. Washing may also, for example be used in the process. These stages can be considered in the context of the overall water and acid balances.

Solid Characterization: The solids recovered from each filtration step were characterized by inspection and by re-dissolving the crystals into water and measuring the pH. Although the quantitative split between sulphate and bisulphate was not obtained via this method, some useful observations were made. The crystals from Test 1 Stage 1 (performed at vacuum) were visually more similar to the monohydrate form than those of Test 2 Stage 1 (performed at atmospheric pressure). For Test 1 Stage 1, the final boiling temperature was 81.9° C., which is below the calculated decomposition temperature of 92° C. at 17 kPa(a). In contrast, for Test 2 Stage 1, the final boiling temperature was 127.2° C., which is at the calculated decomposition temperature of 127° C. at 101 kPa(a). This indicates that an advantage of operating under vacuum is that it helps to maintain the monohydrate crystal form when trying to maximize the lithium sulphate recovery. The crystal from Stage 2 (equivalent to the SARC) from both tests was a fine, chalky powder. While not wishing to be limited by theory, this, along with the lower pH when dissolved in water, indicates a large percentage of the crystals are in the bisulphate form, in line with these high acid concentrations.

III. Conclusions and Conceptual Flow Diagram

The following are findings which may, while not wishing to be limited by theory, have an impact on the final design:

Based on observations in the present studies, it would be impractical to concentrate the anolyte solution directly to 96 wt % acid and salts as the viscous gel-like nature of the mixture would, while not wishing to be limited by theory, most likely be prone, for example, to freezing/plugging of equipment and piping and be difficult to handle. Therefore, removal of lithium sulphate crystals at an intermediate concentration is advantageous.

The minimum solubility of lithium sulphate occurs at ~48 wt % $H_2SO_4$ (58 wt % acid+salts), after which the crystals begin to switch to the anhydrous form and the solubility increases until the bisulphate crystals begin to form at ~62 wt % $H_2SO_4$ (~80 wt % acid and salts). Therefore, to maximize the recovery of lithium sulphate the evaporative crystallizer may, for example, concentrate to about 48 wt % $H_2SO_4$ in the solution. Based on the feed specification, the process may, for example, give a theoretical maximum lithium sulphate recovery of 87% (81% was measured in the lab).

Given the crystal properties and solution viscosities, a concentration of ~65 wt % $H_2SO_4$ in the crystallizer may, for example be used. While this doesn't give the optimum crystal recovery, if this concentration is useful in an initial extraction process of lithium from spodumene, it would avoid additional unit operations by eliminating the SARC system.

Concentrations higher than 65 wt % in the crystallizer are not efficiently performed in multiple effect evaporation due to the boiling point rise. While not wishing to be limited by theory, any concentration between 65 to 96 wt % would require the addition of a SARC following the crystallizer but the chosen initial and final concentrations may have a large effect on size/cost.

When the filtrate from the crystallizer (at 48 wt % $H_2SO_4$) is further concentrated in the SARC (to 96 wt % acid+salts), the resulting solution may, for example, be in single phase and clear of any solid crystal particles. Upon cooling, crystals will start to form and precipitate at an estimated temperature of 130° C. If allowed to cool to 30° C., another 2.5% of the initial amount of lithium sulfate can be recovered as lithium bisulphate; however this may, for example, result in acid losses. While not wishing to be limited by theory, it is useful from the view of complexity and cost to send the acid hot to the spodumene reactor A benefit of operating the crystallizer under vacuum is that it appears to help the crystals remain as monohydrates rather than decomposing into the anhydrous form and allows the minimum solubility point to be reached.

Settling time was in the order of minutes. However, the crystals did not compact very well and had ~50 wt % liquid entrainment. Therefore an additional unit operation may, for example, be used to mechanically separate the entrained liquid. Also washing of the crystals may be used to minimize lithium hydroxide addition for pH adjustment due to acid carry-over. Care is used by the skilled person to ensure that the crystals are not re-dissolved.

Figure 6:
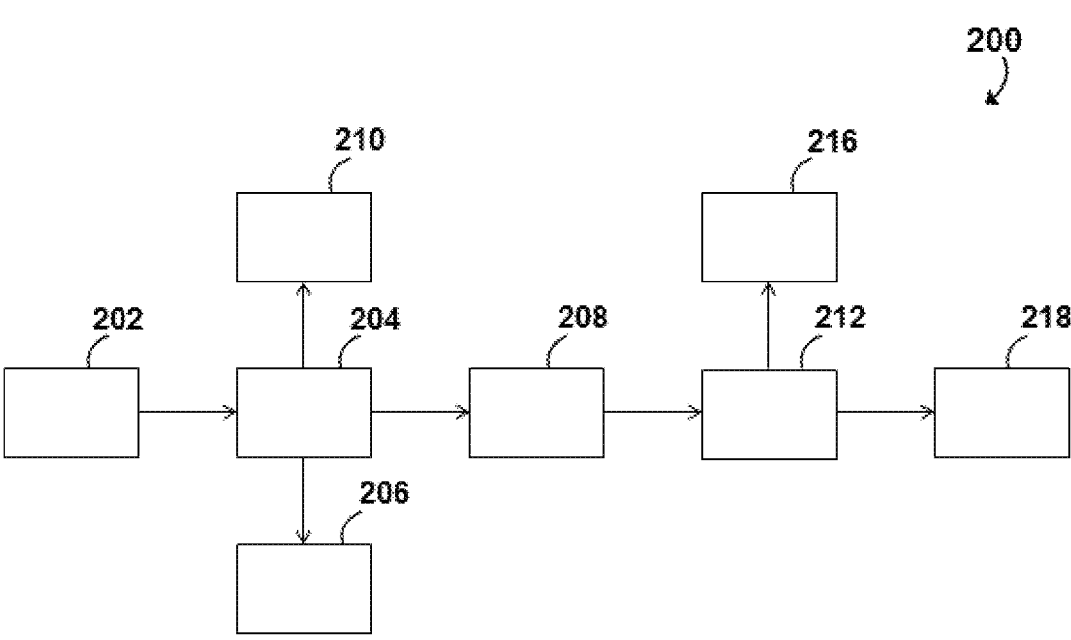
FIG. 6 is a schematic diagram of a process according to another example of the present disclosure.

Based on the experimental testing performed, the exemplary process flow diagram shown in FIG. 6 was created. The process 200 exemplified therein is for treating an aqueous composition comprising lithium sulfate and sulfuric acid. Referring to FIG. 6, in the process exemplified therein, the aqueous composition comprising lithium sulfate and sulfuric acid 202 is evaporatively crystallized 204 under conditions to obtain crystals of lithium sulfate monohydrate 206 and a lithium sulfate-reduced solution (filtrate 208). For example, the evaporative crystallizer 204 can be either single or multiple effect and can, for example, be operated at a pressure of about 16 kPa and a temperature ($T_f$) of about 82° C. The crystals of the lithium sulfate monohydrate 206 are optionally separated from the lithium sulfate-reduced solution 208. The evaporative crystallization 204 also produces a first acidic condensate 210. The lithium sulfate-reduced solution 208 is optionally concentrated 212 under conditions to obtain a second acidic condensate 216 and a concentrate comprising sulfuric acid 218. For example, the concentrating can be carried out by a SARC™ process which is carried out at a pressure of about 2 kPa and a temperature ($T_f$) of about 190° C.

For example, in the process 200 shown in FIG. 6, the aqueous composition comprising lithium sulfate and sulfuric acid 202 can be an anolyte feed comprising, on a 100 kg basis, about 19.5 wt % $Li_2SO_4$, 1.3 wt % $Na_2SO_4$, 12.2 wt % $H_2SO_4$ and 67.0 wt % $H_2O$. For example, about 19.7 kg of crystals of lithium sulfate monohydrate 206 can be obtained in such an example of process 200 (assuming, while not wishing to be limited by theory, an about 82% recovery and no entrainment of filtrate 208), optionally having a composition of about 94.6 wt % $Li_2SO_4 \cdot H_2O$ and about 1.3 wt % $Na_2SO_4$. For example, about 26.9 kg of filtrate 208 can be obtained, optionally having a composition of about 13.1 wt % $Li_2SO_4$, 0.9 wt % $Na_2SO_4$, 45.2 wt % $H_2SO_4$ and 40.8 wt % $H_2O$. For example, about 53.4 kg of first acidic condensate 210 can be obtained which can, for example, have a pH of about 3. For example, about 10.3 kg of the second acidic concentrate 216 can be obtained which can, for example, have a pH of about 1. For example, about 16.6 kg of the concentrate comprising sulfuric acid 218 can be obtained which optionally has a composition of about 21.2 wt % $Li_2SO_4$, about 1.4 wt % $Na_2SO_4$, about 73.4 wt % $H_2SO_4$ and about 4.0 wt % $H_2O$.

Figure 7:
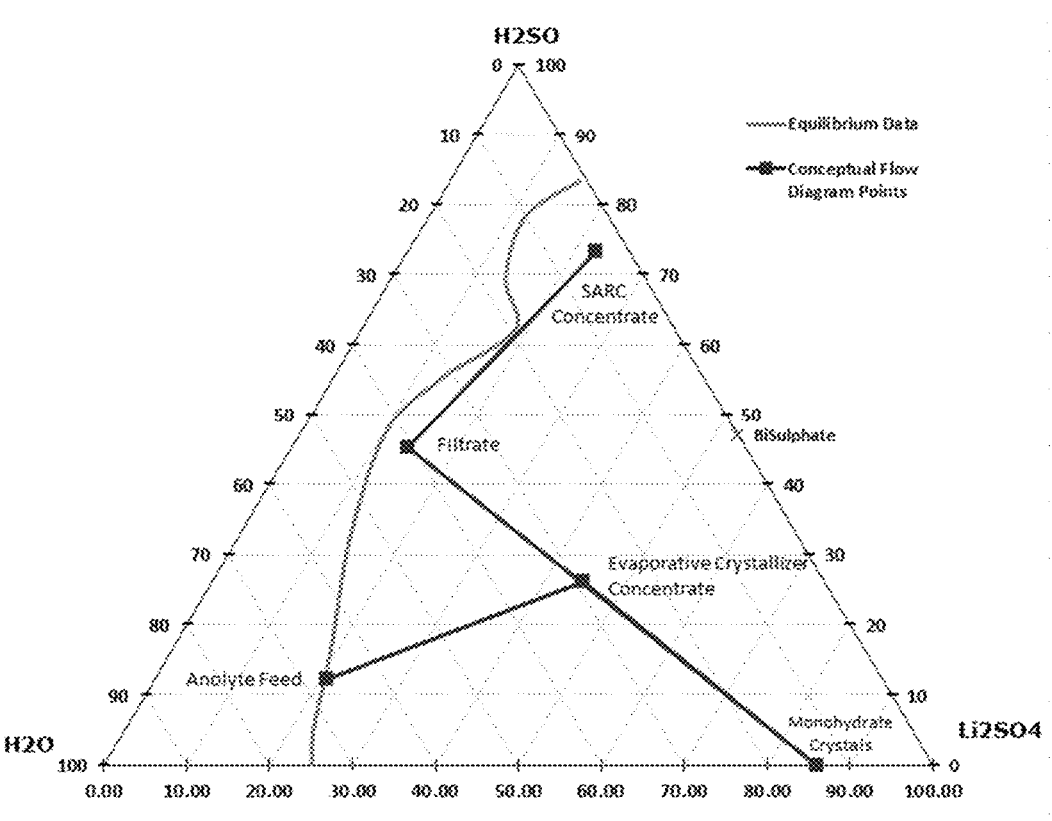
FIG. 7 is a ternary phase diagram of a process according to another example of the present disclosure.

FIG. 7 shows a ternary phase diagram which was developed in accordance with the examples of the present disclosure.

IV. Solubility Test—Solubility of Lithium Sulfate in 50 wt % Sulfuric Acid

(a) Summary

The solubility of lithium sulfate in 50 wt % sulfuric acid was determined experimentally to be 13.29-13.32 wt % at 50° C. The behaviour of solubility with respect to temperature was tested by heating the saturated solution from 50° C. to 70° C., followed by cooling to 30° C.

(b) Method 50 g of 50 wt % $H_2SO_4$ was brought into a 100 mL round bottom flask (rbf) equipped with a stir bar and condenser and was heated to 50° C. with a temperature-controlled water bath. $Li_2SO_4$ was then added in increments until saturated (solution turned cloudy); initially three 1 g portions were added then subsequent additions were added by spatula and weighed by difference. The cloudy solution was stirred at 50° C. for ½ hour to confirm the saturation point had been reached then 50 wt % $H_2SO_4$ added dropwise until the solution cleared. The solution was then heated to 70° C. and held at temperature for ~1 hr with stirring, followed by no stirring for ½ hr. Finally, the solution was cooled to 30° C. without stirring and held at temperature for over 1 hr.

(c) Materials

Sulfuric acid solution was prepared by dilution as shown in Table 3 (analyzed by Anton Parr):

TABLE 3

| Preparation of 50 wt % $H_2SO_4$ | |
| --- | --- |
| Initial concentration (wt %) | 63.97 |
| Final concentration (wt %) | 49.97 |
| Specific gravity | 1.3973 |
| Density (g/cm³) | 1.39475 |
| Temperature (° C.) | 20.001 |

Lithium sulfate, anhydrous—≥98.0%, was from Aldrich Chemistry, product #62613-1KG, lot #BCBL6287V.

(d) Results/Observations

Results and observations are provided in Tables 4 and 5:

TABLE 4

| Solubility of $Li_2SO_4$ in 50 wt % $H_2SO_4$ at 50° C. | |
| --- | --- |
| $H_2SO_4$ concentration (wt %) | 49.97 |
| Temperature (° C.) | 50.0 |
| $H_2SO_4$ added (g) | 51.24-51.38 |
| $Li_2SO_4$ added (g) | 7.8728 |
| Solubility (wt %) | 13.29-13.32 |

TABLE 5

| Effect of temperature on $Li_2SO_4$ solubility in 50 wt % $H_2SO_4$ | | |
| --- | --- | --- |
| Temperature (° C.) | Appearance | Conclusion |
| 30 | Colourless crystals form in the bottom of the beaker, with a clear and colourless supernatant | Past the point of saturation |
| 50 | Cloudy/clear solution | Saturated solution |
| 70 | Clear and colourless solution | Saturated or below saturation |

The anhydrous lithium sulfate was a fine, white powder The saturation point at 50° C. was observed when the solution turned cloudy. The solution remained clear and colourless when heated to 70° C. Crystallization occurred when the solution was cooled to 30° C.

V. Boiling Point Rise Tests

(a) Summary

Four experiments were performed to measure the boiling point rise (BPR) of a synthetic anolyte solution containing lithium sulfate, sodium sulfate and sulfuric acid in the range of 30-96 wt % total acid and salts at atmospheric pressure and under vacuum. Table 6 contains a summary of these tests.

TABLE 6

| Summary of BPR tests | | | |
| --- | --- | --- | --- |
| Experiment | Pressure | Initial concentration | Final Concentration |
| BPR-1 | Atmospheric | 30 wt % total acid + salt 70 wt % water | 84 wt % total acid + salt 16 wt % water |
| BPR-2 | Atmospheric | 65 wt % total acid + salt 35 wt % water | 96 wt % total acid + salt 4 wt % water |
| BPR-3 | 17 kPa | 30 wt % total acid + salt 70 wt % water | 83 wt % total acid + salt 17 wt % water |
| BPR-4 | 3 kPa | 65 wt % total acid + salt 35 wt % water | 96 wt % total acid + salt 4 wt % water |

(b) Materials

Lithium Sulfate, anhydrous—≥98.0%, was from Aldrich Chemistry, product #62613-1KG, lot #BCBL6287V. Sodium sulfate, anhydrous, granular, free-flowing, Redi-Dri™, ACS reagent, 99%, was from Sigma-Aldrich, product #798592-500g, lot #MKBV7489V. All solutions were prepared with deionized water. Sulfuric acid concentration and solution density measurements were determined using an Anton Paar DSA 5000 M Density and sound velocity meter.

(c) Equipment

A vacuum distillation apparatus was used to concentrate the solutions that was made up of a reflux condenser with a cold finger connected to a distillation condenser. Headspace temperature was measured by a thermometer before the vapours reached the cold finger. The reflux condenser and distillation condenser were connected with a kontes tap. The cold finger could be rotated to direct condensate towards the distillate collected or back towards the concentrate. Cooling water for the cold finger and distillation condenser was either tap water or was from a connected circulating, temperature-controllable water bath. The solutions were concentrated in round bottom flasks equipped with a thermometer or thermocouple. Condensate was collected into graduated bottles with ground glass necks. The solutions were heated with electric heating mantles.

(d) Experimental

Initial solutions for the experiments were prepared at 2 concentration levels with the same ratio of acid and salts. A bulk batch of solution 1 at 30 wt % acid and salts was prepared and used in tests BPR-1 and BPR-3. A fresh batch of solution 2, at 65 wt % acid and salts, was prepared directly in the flasks for each of tests BPR-2 and BPR-4 as the salts were not fully soluble at the initial concentration at room temperature. Table 7 contains data on the compositions.

TABLE 7

| Compositions of synthetic anolyte solutions[1] | | | |
|---|---|---|---|
| Composition | Solution 1 | Solution 2 (BPR-2) | Solution 2 (BPR-4) |
| $H_2O$ | 70.01 | 35.11 | 35.11 |
| $H_2SO_4$ | 11.08 | 23.93 | 23.93 |
| $Li_2SO_4$ | 17.73 | 38.41 | 38.41 |
| $Na_2SO_4$ | 1.18 | 2.56 | 2.56 |
| Acid + Salt Conc[2] | 29.99 | 64.89 | 64.89 |
| Density (g/cm³) | 1.24 | — | — |

[1]Concentrations provided in wt %.

[2]Refers to the overall amount of $H_2SO_4$, $Li_2SO_4$, and $Na_2SO_4$ in the solutions. This was calculated based on the initial composition of the anolyte solutions.

(e) Basic Procedure

The solution was charged into a round bottom flask (rbf) and the flask was equipped with a thermometer or thermocouple, boiling chip or stir bar, and electric heating mantle. The flask was connected to distillation apparatus and brought to a boil, upon which the temperature was recorded, the timer was started and collecting the condensate was begun. For tests BPR-3 and BPR-4, the distillation apparatus was connected to the vacuum pump and the system was brought to the target vacuum pressure prior to heating. The water was slowly evaporated off and the time, temperature (solution and vapour) and volume of condensate accumulated was recorded. The point at which crystals began to form was also recorded.

Due to the slow evaporation rate, each experiment was completed over two or three days. Between days, the concentrates and equipment were cooled to room temperature at atmospheric pressure. Solutions were re-heated to reflux at the desired pressure prior to re-starting condensate collection. Table 8 contains an overview of the details and modifications for each test.

TABLE 8

| Details and modifications for each test | | |
|---|---|---|
| Test | Equipment | Procedure Notes |
| BPR-1 | 1 L, 2-neck rbf 2 × 250 mL bottles for condensate | Test was completed over 2 days. A boiling chip was only added for the second section of the test. |
| BPR-2 | 500 mL, 3-neck rbf 250 mL bottle for condensate | Test was completed over 2 days. Both magnetic stirrer and boiling chip used in solution. |
| BPR-3 | 1 L, 3-neck rbf 2 × 250 mL bottles for condensate | Test was completed over 2 days. Boiling chip was added at the beginning of the test. |
| BPR-4 | 500 mL, 3-neck rbf 250 mL bottle for condensate | Test was completed over 3 days. Magnetic stirrer was used for test. |

(f) Results

Table 9 highlights the compositions and boiling points of the solution at their initial and final compositions. The full data collected can be found in Table 10 (BPR-1), Table 11 (BPR-2), Table 12 (BPR-3) and Table 13 (BPR-4).

TABLE 9

| Summary of BPR test results | | | | | | | | |
|---|---|---|---|---|---|---|---|---|
| Test | BPR-1 | | BPR-2 | | BPR-3 | | BPR-4 | |
| Pressure | atmospheric | | atmospheric | | 17 kPa | | 3 kPa | |
| Initial mass (g) | 620.63 | | 500.05 | | 622.05 | | 500.05 | |
| Condensate volume (mL) | 400 | | 162 | | 396 | | 162 | |
| Condensate mass (g) | 397.23 | | 160.87 | | 393.2 | | 160.71 | |
| Composition (wt %) | Feed | Final | Feed | Final | Feed | Final | Feed | Final |
| $H_2O$ | 70.0% | 15.6% | 35.1% | 4.0% | 70.0% | 17.5% | 35.1% | 4.0% |
| $H_2SO_4$ | 11.1% | 31.2% | 23.9% | 35.4% | 11.1% | 30.5% | 23.9% | 35.4% |
| $Li_2SO_4$ | 17.7% | 49.9% | 38.4% | 56.8% | 17.7% | 48.8% | 38.4% | 56.8% |
| $Na_2SO_4$ | 1.2% | 3.3% | 2.6% | 3.8% | 1.2% | 3.3% | 2.6% | 3.8% |
| Total Acid + Salts | 30.0% | 84.4% | 64.9% | 96.0% | 30.0% | 82.5% | 64.9% | 96.0% |
| Boiling Point | 104° C. | 148.5° C. | 124.0° C. | 239.0° C. | 66.6° C. | 113.6° C. | 53.4° C. | 163.0° C. |

TABLE 10

| Data for BPR-1 | | | | | | | | |
|---|---|---|---|---|---|---|---|---|
| Time | Temperature (° C.) | | Condensate | Concentrate composition (wt %) | | | | |
| Minutes | Flask | Head space | Vol (mL) | Acid + salts | $H_2O$ | $H_2SO_4$ | $Li_2SO_4$ | $Na_2SO_4$ |
| 0 | 103.8 | 99.0 | 0 | 30.0% | 70.0% | 11.1% | 17.7% | 1.2% |
| 20 | 104.3 | 100.0 | 20 | 31.0% | 69.0% | 11.5% | 18.3% | 1.2% |
| 27 | 104.8 | 100.0 | 30 | 31.5% | 68.5% | 11.6% | 18.6% | 1.2% |
| 35 | 104.8 | 100.0 | 40 | 32.1% | 67.9% | 11.8% | 19.0% | 1.3% |
| 42 | 105.8 | 100.0 | 50 | 32.6% | 67.4% | 12.1% | 19.3% | 1.3% |
| 48 | 105.8 | 100.0 | 60 | 33.2% | 66.8% | 12.3% | 19.6% | 1.3% |
| 61 | 105.8 | 100.0 | 80 | 34.4% | 65.6% | 12.7% | 20.4% | 1.4% |
| 115 | 106.3 | 101.0 | 100 | 35.8% | 64.2% | 13.2% | 21.1% | 1.4% |
| 127 | 106.8 | 101.0 | 120 | 37.2% | 62.8% | 13.7% | 22.0% | 1.5% |
| 138 | 107.8 | 101.0 | 140 | 38.7% | 61.3% | 14.3% | 22.9% | 1.5% |
| 151 | 107.8 | 101.0 | 160 | 40.4% | 59.6% | 14.9% | 23.9% | 1.6% |
| 153 | 107.8 | 101.0 | 162 | 40.6% | 59.4% | 15.0% | 24.0% | 1.6% |

TABLE 10-continued

| Data for BPR-1 | | | | | | | | |
|---|---|---|---|---|---|---|---|---|
| Time | Temperature (° C.) | | Condensate | Concentrate composition (wt %) | | | | |
| Minutes | Flask | Head space | Vol (mL) | Acid + salts | H₂O | H₂SO₄ | Li₂SO₄ | Na₂SO₄ |
| 159 | 107.8 | 100.0 | 174 | 41.7% | 58.3% | 15.4% | 24.6% | 1.6% |
| 164 | 107.8 | 100.0 | 182 | 42.4% | 57.6% | 15.7% | 25.1% | 1.7% |
| 169 | 108.8 | 100.5 | 192 | 43.4% | 56.6% | 16.0% | 25.7% | 1.7% |
| 175 | 108.8 | 100.5 | 202 | 44.5% | 55.5% | 16.4% | 26.3% | 1.8% |
| 185 | 109.3 | 100.0 | 212 | 45.6% | 54.4% | 16.8% | 26.9% | 1.8% |
| 193 | 109.8 | 100.0 | 222 | 46.7% | 53.3% | 17.3% | 27.6% | 1.8% |
| 203 | 109.8 | 100.0 | 232 | 47.9% | 52.1% | 17.7% | 28.3% | 1.9% |
| 211 | 110.8 | 100.0 | 242 | 49.2% | 50.8% | 18.2% | 29.1% | 1.9% |
| 220 | 111.3 | 99.5 | 252 | 50.5% | 49.5% | 18.7% | 29.8% | 2.0% |
| 228 | 111.8 | 100.0 | 262 | 51.9% | 48.1% | 19.2% | 30.7% | 2.0% |
| 236 | 112.8 | 100.0 | 272 | 53.4% | 46.6% | 19.7% | 31.6% | 2.1% |
| 245 | 113.8 | 100.0 | 284 | 55.3% | 44.7% | 20.4% | 32.7% | 2.2% |
| 251 | 114.3 | 100.0 | 292 | 56.6% | 43.4% | 20.9% | 33.5% | 2.2% |
| 261 | 115.3 | 100.0 | 302 | 58.4% | 41.6% | 21.6% | 34.5% | 2.3% |
| 268 | 116.8 | 100.0 | 312 | 60.3% | 39.7% | 22.3% | 35.7% | 2.4% |
| 273 | 117.3 | 100.0 | 318 | 61.5% | 38.5% | 22.7% | 36.4% | 2.4% |
| 276 | 118.3 | 100.0 | 322 | 62.3% | 37.7% | 23.0% | 36.8% | 2.5% |
| 280 | 118.8 | 100.0 | 327 | 63.4% | 36.6% | 23.4% | 37.5% | 2.5% |
| 284 | 119.8 | 100.0 | 332 | 64.5% | 35.5% | 23.8% | 38.1% | 2.5% |
| 289 | 121.8 | 100.0 | 337 | 65.6% | 34.4% | 24.3% | 38.8% | 2.6% |
| 293 | 122.8 | 101.0 | 342 | 66.8% | 33.2% | 24.7% | 39.5% | 2.6% |
| 297 | 123.8 | 101.5 | 347 | 68.0% | 32.0% | 25.1% | 40.2% | 2.7% |
| 302 | 125.3 | 102.0 | 352 | 69.3% | 30.7% | 25.6% | 41.0% | 2.7% |
| 287 | 125.3 | 101.0 | 357 | 70.6% | 29.4% | 26.1% | 41.7% | 2.8% |
| 312 | 126.3 | 101.0 | 362 | 72.0% | 28.0% | 26.6% | 42.5% | 2.8% |
| 317 | 127.8 | 102.0 | 367 | 73.4% | 26.6% | 27.1% | 43.4% | 2.9% |
| 322 | 129.8 | 102.0 | 372 | 74.9% | 25.1% | 27.7% | 44.3% | 2.9% |
| 326 | 131.3 | 101.0 | 374 | 75.5% | 24.5% | 27.9% | 44.6% | 3.0% |
| 328 | 131.8 | 101.0 | 376 | 76.1% | 23.9% | 28.1% | 45.0% | 3.0% |
| 330 | 132.8 | 102.0 | 378 | 76.7% | 23.3% | 28.4% | 45.3% | 3.0% |
| 332 | 134.3 | 102.0 | 380 | 77.4% | 22.6% | 28.6% | 45.7% | 3.0% |
| 334 | 135.3 | 102.5 | 382 | 78.0% | 22.0% | 28.8% | 46.1% | 3.1% |
| 336 | 136.8 | 103.0 | 384 | 78.7% | 21.3% | 29.1% | 46.5% | 3.1% |
| 338 | 137.8 | 103.0 | 386 | 79.3% | 20.7% | 29.3% | 46.9% | 3.1% |
| 341 | 139.3 | 103.5 | 388 | 80.0% | 20.0% | 29.6% | 47.3% | 3.2% |
| 343 | 140.8 | 103.5 | 390 | 80.7% | 19.3% | 29.8% | 47.7% | 3.2% |
| 345 | 141.8 | 103.0 | 392 | 81.4% | 18.6% | 30.1% | 48.1% | 3.2% |
| 347 | 143.3 | 103.0 | 394 | 82.1% | 17.9% | 30.4% | 48.6% | 3.2% |
| 350 | 145.3 | 104.0 | 396 | 82.9% | 17.1% | 30.6% | 49.0% | 3.3% |
| 353 | 147.8 | 104.0 | 398 | 83.6% | 16.4% | 30.9% | 49.4% | 3.3% |
| 356 | 150.3 | 104.5 | 400 | 84.4% | 15.6% | 31.2% | 49.9% | 3.3% |

TABLE 11

| Data for BPR-2 | | | | | | | | |
|---|---|---|---|---|---|---|---|---|
| Time | Temperature (° C.) | | Condensate | Concentrate composition (wt %) | | | | |
| Minutes | Flask | Head space | Vol (mL) | Acid + salts | H₂O | H₂SO₄ | Li₂SO₄ | Na₂SO₄ |
| 0 | 124.0 | 100.0 | 0 | 64.9% | 35.1% | 23.9% | 38.4% | 2.6% |
| 29 | 125.4 | 100.0 | 10 | 66.2% | 33.8% | 24.4% | 39.2% | 2.6% |
| 40 | 126.3 | 101.0 | 15 | 66.9% | 33.1% | 24.7% | 39.6% | 2.6% |
| 52 | 127.6 | 101.0 | 20 | 67.6% | 32.4% | 24.9% | 40.0% | 2.7% |
| 60 | 128.4 | 101.0 | 25 | 68.3% | 31.7% | 25.2% | 40.4% | 2.7% |
| 71 | 128.7 | 102.0 | 30 | 69.0% | 31.0% | 25.5% | 40.9% | 2.7% |
| 81 | 128.5 | 102.0 | 36 | 69.9% | 30.1% | 25.8% | 41.4% | 2.8% |
| 88 | 128.4 | 102.0 | 40 | 70.5% | 29.5% | 26.0% | 41.7% | 2.8% |
| 95 | 129.6 | 102.0 | 45 | 71.3% | 28.7% | 26.3% | 42.2% | 2.8% |
| 105 | 130.3 | 102.0 | 50 | 72.1% | 27.9% | 26.6% | 42.7% | 2.8% |
| 120 | 132.5 | 101.0 | 60 | 73.7% | 26.3% | 27.2% | 43.6% | 2.9% |
| 146 | 134.9 | 101.0 | 70 | 75.5% | 24.5% | 27.8% | 44.7% | 3.0% |
| 146 | 135.2 | 100.0 | 70 | 75.5% | 24.5% | 27.8% | 44.7% | 3.0% |
| 179 | 138.9 | 101.0 | 80 | 77.3% | 22.7% | 28.5% | 45.7% | 3.0% |
| 221 | 142.5 | 101.5 | 90 | 79.1% | 20.9% | 29.2% | 46.8% | 3.1% |
| 237 | 145.0 | 102.0 | 95 | 80.1% | 19.9% | 29.5% | 47.4% | 3.2% |
| 254 | 147.6 | 102.0 | 100 | 81.1% | 18.9% | 29.9% | 48.0% | 3.2% |
| 290 | 154.0 | 102.5 | 110 | 83.2% | 16.8% | 30.7% | 49.2% | 3.3% |
| 300 | 157.7 | 102.5 | 115 | 84.3% | 15.7% | 31.1% | 49.9% | 3.3% |
| 317 | 161.9 | 102.0 | 120 | 85.4% | 14.6% | 31.5% | 50.5% | 3.4% |
| 330 | 166.0 | 102.0 | 125 | 86.5% | 13.5% | 31.9% | 51.2% | 3.4% |

TABLE 11-continued

| | | | | Data for BPR-2 | | | | |
|---|---|---|---|---|---|---|---|---|
| Time | Temperature (° C.) | | Condensate | Concentrate composition (wt %) | | | | |
| Minutes | Flask | Head space | Vol (mL) | Acid + salts | $H_2O$ | $H_2SO_4$ | $Li_2SO_4$ | $Na_2SO_4$ |
| 345 | 171.8 | 102.0 | 130 | 87.7% | 12.3% | 32.3% | 51.9% | 3.5% |
| 360 | 177.5 | 102.0 | 135 | 88.9% | 11.1% | 32.8% | 52.6% | 3.5% |
| 378 | 185.4 | 102.0 | 140 | 90.1% | 9.9% | 33.2% | 53.3% | 3.6% |
| 389 | 192.1 | 102.0 | 144 | 91.1% | 8.9% | 33.6% | 53.9% | 3.6% |
| 398 | 196.4 | 101.0 | 146 | 91.7% | 8.3% | 33.8% | 54.2% | 3.6% |
| 404 | 199.6 | 101.0 | 148 | 92.2% | 7.8% | 34.0% | 54.6% | 3.6% |
| 411 | 204.0 | 101.0 | 150 | 92.7% | 7.3% | 34.2% | 54.9% | 3.7% |
| 422 | 208.0 | 100.0 | 152 | 93.2% | 6.8% | 34.4% | 55.2% | 3.7% |
| 429 | 212.0 | 100.0 | 154 | 93.8% | 6.2% | 34.6% | 55.5% | 3.7% |
| 439 | 217.0 | 100.0 | 156 | 94.3% | 5.7% | 34.8% | 55.8% | 3.7% |
| 449 | 223.0 | 98.0 | 158 | 94.9% | 5.1% | 35.0% | 56.1% | 3.7% |
| 461 | 232.0 | 96.0 | 160 | 95.4% | 4.6% | 35.2% | 56.5% | 3.8% |
| 474 | 239.0 | 96.0 | 162 | 96.0% | 4.0% | 35.4% | 56.8% | 3.8% |

TABLE 12

| | | | | Data for BPR-3 | | | | |
|---|---|---|---|---|---|---|---|---|
| Time | Temperature (° C.) | | Condensate | Concentrate composition (wt %) | | | | |
| Minutes | Flask | Head space | Vol (mL) | Acid + salts | $H_2O$ | $H_2SO_4$ | $Li_2SO_4$ | $Na_2SO_4$ |
| 3 | 66.6 | 61.0 | 0 | 30.0% | 70.0% | 11.1% | 17.7% | 1.2% |
| 31 | 67.3 | 62.0 | 20 | 31.0% | 69.0% | 11.5% | 18.3% | 1.2% |
| 47 | 67.5 | 62.0 | 30 | 31.5% | 68.5% | 11.6% | 18.6% | 1.2% |
| 63 | 67.4 | 62.0 | 40 | 32.1% | 67.9% | 11.8% | 18.9% | 1.3% |
| 79 | 67.8 | 62.0 | 50 | 32.6% | 67.4% | 12.1% | 19.3% | 1.3% |
| 97 | 68.8 | 62.5 | 60 | 33.2% | 66.8% | 12.3% | 19.6% | 1.3% |
| 112 | 69.1 | 62.5 | 70 | 33.8% | 66.2% | 12.5% | 20.0% | 1.3% |
| 127 | 69.5 | 62.0 | 80 | 34.4% | 65.6% | 12.7% | 20.3% | 1.4% |
| 142 | 69.5 | 62.5 | 90 | 35.1% | 64.9% | 13.0% | 20.7% | 1.4% |
| 158 | 69.7 | 62.5 | 100 | 35.7% | 64.3% | 13.2% | 21.1% | 1.4% |
| 171 | 70.0 | 62.5 | 110 | 36.4% | 63.6% | 13.5% | 21.5% | 1.4% |
| 190 | 70.3 | 62.5 | 124 | 37.5% | 62.5% | 13.8% | 22.1% | 1.5% |
| 205 | 69.8 | 60.5 | 136 | 38.4% | 61.6% | 14.2% | 22.7% | 1.5% |
| 212 | 69.5 | 62.5 | 140 | 38.7% | 61.3% | 14.3% | 22.9% | 1.5% |
| 225 | 69.6 | 63.0 | 150 | 39.5% | 60.5% | 14.6% | 23.4% | 1.6% |
| 235 | 69.9 | 63.0 | 160 | 40.4% | 59.6% | 14.9% | 23.9% | 1.6% |
| 245 | 70.1 | 63.5 | 170 | 41.3% | 58.7% | 15.3% | 24.4% | 1.6% |
| 256 | 70.3 | 64.0 | 180 | 42.2% | 57.8% | 15.6% | 24.9% | 1.7% |
| 266 | 70.5 | 64.0 | 190 | 43.2% | 56.8% | 16.0% | 25.5% | 1.7% |
| 271 | 70.9 | 64.5 | 200 | 44.2% | 55.8% | 16.3% | 26.1% | 1.7% |
| 548 | 71.2 | 64.5 | 210 | 45.3% | 54.7% | 16.7% | 26.8% | 1.8% |
| 271 | 71.6 | 66.0 | 220 | 46.4% | 53.6% | 17.1% | 27.4% | 1.8% |
| 271 | 72.0 | 66.0 | 230 | 47.6% | 52.4% | 17.6% | 28.1% | 1.9% |
| 572 | 72.4 | 66.0 | 240 | 48.8% | 51.2% | 18.0% | 28.9% | 1.9% |
| 271 | 72.9 | 66.0 | 250 | 50.1% | 49.9% | 18.5% | 29.6% | 2.0% |
| 588 | 73.3 | 65.0 | 260 | 51.5% | 48.5% | 19.0% | 30.5% | 2.0% |
| 596 | 74.0 | 65.0 | 270 | 53.0% | 47.0% | 19.6% | 31.3% | 2.1% |
| 605 | 74.7 | 65.5 | 280 | 54.5% | 45.5% | 20.2% | 32.2% | 2.1% |
| 613 | 75.6 | 65.0 | 290 | 56.2% | 43.8% | 20.8% | 33.2% | 2.2% |
| 272 | 77.0 | 66.0 | 300 | 57.9% | 42.1% | 21.4% | 34.2% | 2.3% |
| 630 | 78.3 | 67.0 | 310 | 59.8% | 40.2% | 22.1% | 35.3% | 2.4% |
| 272 | 81.1 | 69.0 | 320 | 61.8% | 38.2% | 22.8% | 36.5% | 2.4% |
| 272 | 83.0 | 69.0 | 330 | 63.9% | 36.1% | 23.6% | 37.8% | 2.5% |
| 273 | 85.0 | 69.0 | 340 | 66.2% | 33.8% | 24.4% | 39.1% | 2.6% |
| 266 | 87.8 | 66.0 | 350 | 68.6% | 31.4% | 25.3% | 40.5% | 2.7% |
| 286 | 90.7 | 66.5 | 360 | 71.2% | 28.8% | 26.3% | 42.1% | 2.8% |
| 296 | 93.5 | 68.0 | 370 | 74.0% | 26.0% | 27.4% | 43.8% | 2.9% |
| 267 | 96.7 | 70.0 | 380 | 77.1% | 22.9% | 28.5% | 45.6% | 3.0% |
| 312 | 101.9 | 71.0 | 386 | 79.0% | 21.0% | 29.2% | 46.7% | 3.1% |
| 316 | 107.6 | 73.0 | 390 | 80.4% | 19.6% | 29.7% | 47.5% | 3.2% |
| 321 | 111.6 | 74.0 | 394 | 81.8% | 18.2% | 30.2% | 48.4% | 3.2% |
| 323 | 113.6 | 74.0 | 396 | 82.54% | 17.46% | 30.5% | 48.8% | 3.3% |

TABLE 13

| | Temperature (° C.) | | Condensate | Concentrate composition (wt %) | | | | |
|---|---|---|---|---|---|---|---|---|
| Time | | | | | | | | |
| Minutes | Flask | Head space | Vol (mL) | Acid + salts | $H_2O$ | $H_2SO_4$ | $Li_2SO_4$ | $Na_2SO_4$ |
| 0 | 53.4 | 35.0 | 0 | 64.9% | 35.1% | 23.9% | 38.4% | 2.6% |
| 17 | 54.4 | 37.5 | 10 | 66.2% | 33.8% | 24.4% | 39.2% | 2.6% |
| 33 | 55.0 | 38.5 | 20 | 67.6% | 32.4% | 24.9% | 40.0% | 2.7% |
| 52 | 57.7 | 39.0 | 30 | 69.0% | 31.0% | 25.5% | 40.9% | 2.7% |
| 76 | 63.7 | 42.0 | 40 | 70.5% | 29.5% | 26.0% | 41.7% | 2.8% |
| 77 | 56.6 | 36.0 | 40 | 70.5% | 29.5% | 26.0% | 41.7% | 2.8% |
| 100 | 59.7 | 39.5 | 50 | 72.1% | 27.9% | 26.6% | 42.7% | 2.8% |
| 134 | 68.5 | 43.0 | 60 | 73.7% | 26.3% | 27.2% | 43.6% | 2.9% |
| 145 | 70.0 | 43.5 | 65 | 74.6% | 25.4% | 27.5% | 44.1% | 2.9% |
| 154 | 79.1 | 49.0 | 70 | 75.5% | 24.5% | 27.8% | 44.7% | 3.0% |
| 171 | 79.9 | 50.5 | 80 | 77.3% | 22.7% | 28.5% | 45.7% | 3.0% |
| 188 | 84.5 | 52.5 | 90 | 79.1% | 20.9% | 29.2% | 46.8% | 3.1% |
| 206 | 93.2 | 54.0 | 100 | 81.1% | 18.9% | 29.9% | 48.0% | 3.2% |
| 214 | 97.4 | 54.0 | 105 | 82.1% | 17.9% | 30.3% | 48.6% | 3.2% |
| 222 | 101.3 | 55.0 | 110 | 83.2% | 16.8% | 30.7% | 49.2% | 3.3% |
| 244 | 113.2 | 54.5 | 120 | 85.4% | 14.6% | 31.5% | 50.5% | 3.4% |
| 264 | 129.2 | 60.0 | 130 | 87.7% | 12.3% | 32.3% | 51.9% | 3.5% |
| 269 | 132.9 | 60.0 | 132 | 88.2% | 11.8% | 32.5% | 52.2% | 3.5% |
| 271 | 94.4 | 44.0 | 134 | 88.6% | 11.4% | 32.7% | 52.5% | 3.5% |
| 276 | 97.3 | 42.0 | 136 | 89.1% | 10.9% | 32.9% | 52.8% | 3.5% |
| 288 | 106.9 | 42.0 | 140 | 90.1% | 9.9% | 33.2% | 53.3% | 3.6% |
| 302 | 115.1 | 40.0 | 144 | 91.1% | 8.9% | 33.6% | 53.9% | 3.6% |
| 314 | 122.3 | 39.5 | 148 | 92.2% | 7.8% | 34.0% | 54.6% | 3.6% |
| 335 | 136.3 | 39.5 | 154 | 93.8% | 6.2% | 34.6% | 55.5% | 3.7% |
| 343 | 143.4 | 39.0 | 156 | 94.3% | 5.7% | 34.8% | 55.8% | 3.7% |
| 348 | 146.9 | 39.0 | 158 | 94.9% | 5.1% | 35.0% | 56.1% | 3.7% |
| 357 | 155.4 | 37.5 | 160 | 95.4% | 4.6% | 35.2% | 56.5% | 3.8% |
| 365 | 163.0 | 37.0 | 162 | 96.0% | 4.0% | 35.4% | 56.8% | 3.8% |

The point at which crystals formed is only noted for test BPR-1 and BPR-3 as the other two tests contained undissolved solids at their initial composition level (Table 14). This point was determined as the concentration level at which point precipitation was first noted in the concentration flask. It can also be considered as a range between the measurement at which the solids were observed and the previous measurement taken.

Figure 8:
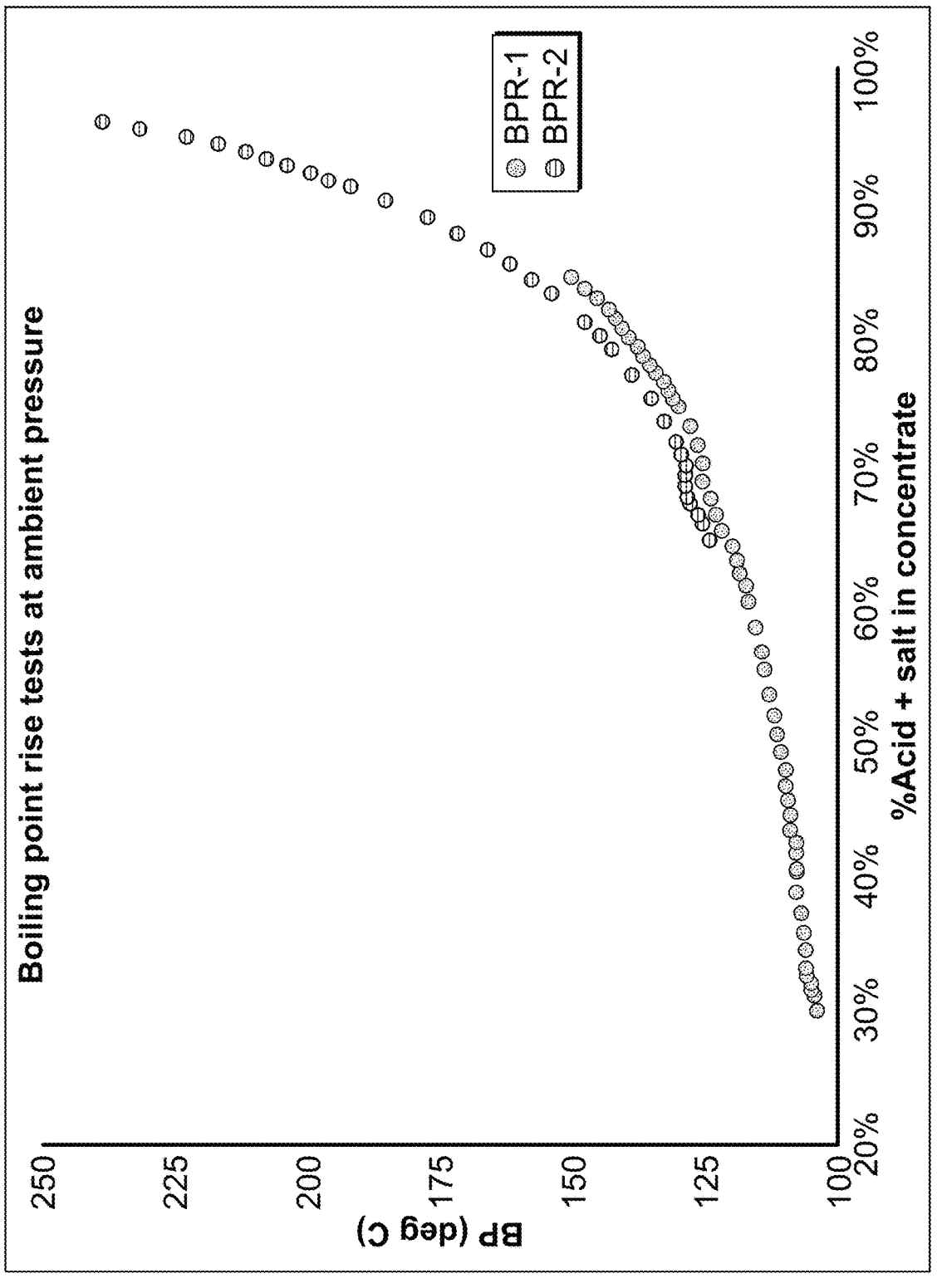
FIG. 8 is a plot showing boiling point (° C.) as a function of total acid and salt in concentrate (wt %) at ambient pressure according to comparative examples BPR-1 (lower plot) and BPR-2 (upper plot) of the present disclosure.
Figure 9:
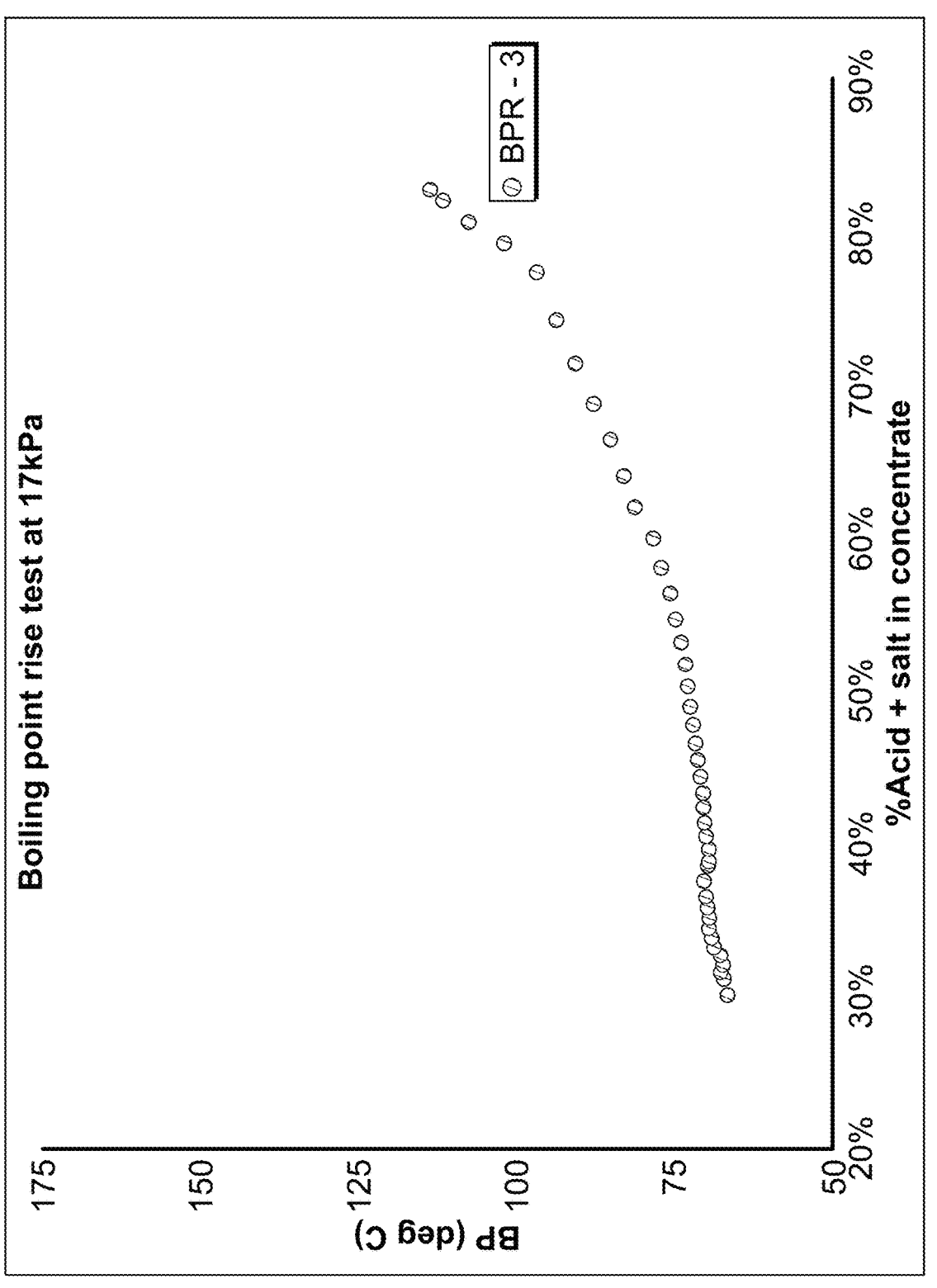
FIG. 9 is a plot showing boiling point (° C.) as a function of total acid and salts in concentrate (wt %) at a pressure of 17 kPa according to comparative example BPR-3 of the present disclosure.
Figure 10:
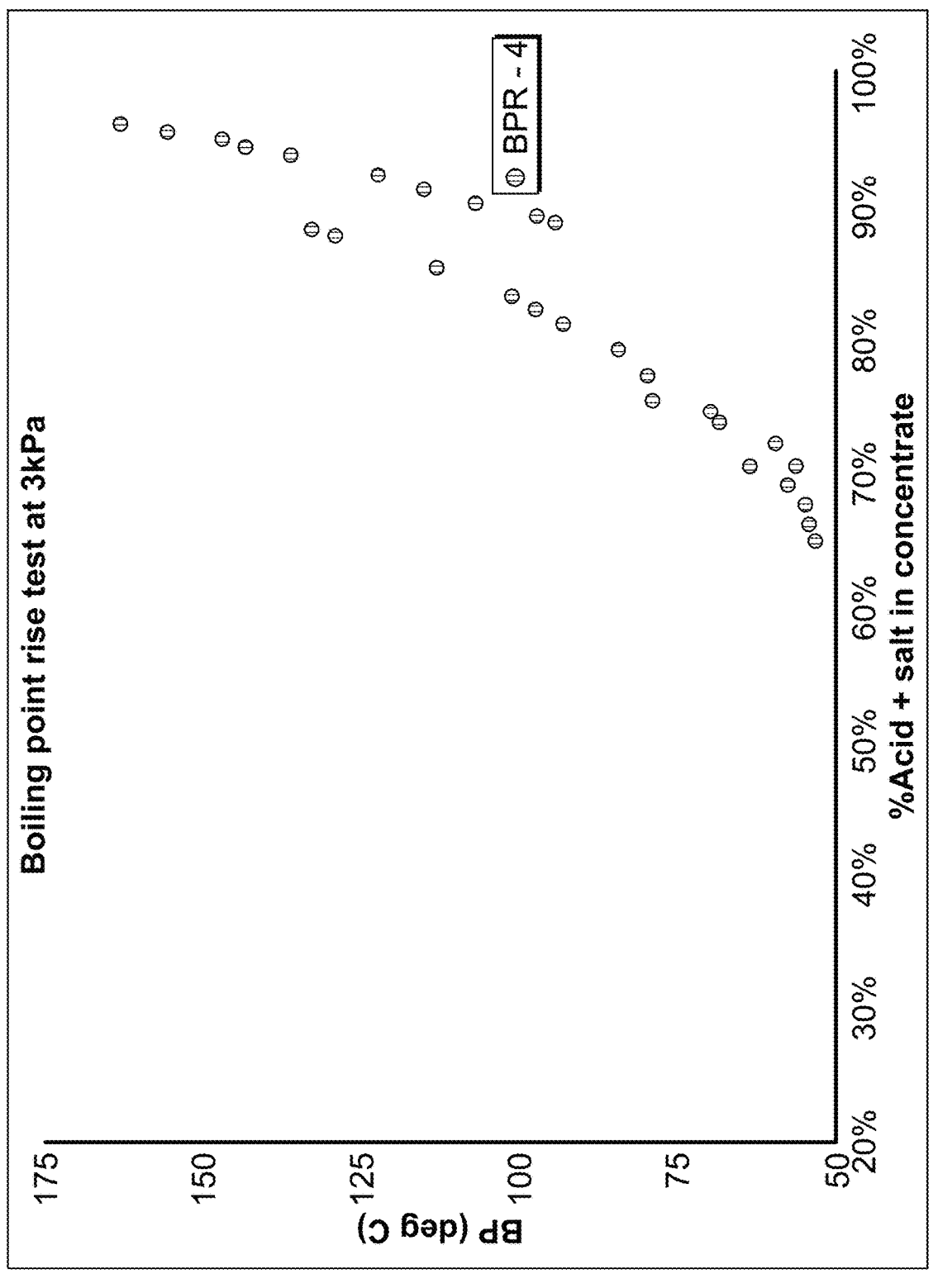
FIG. 10 is a plot showing boiling point (° C.) as a function of total acid and salts in concentrate (wt %) at a pressure of 3 kPa according to comparative example BPR-4 of the present disclosure.
Figure 11:
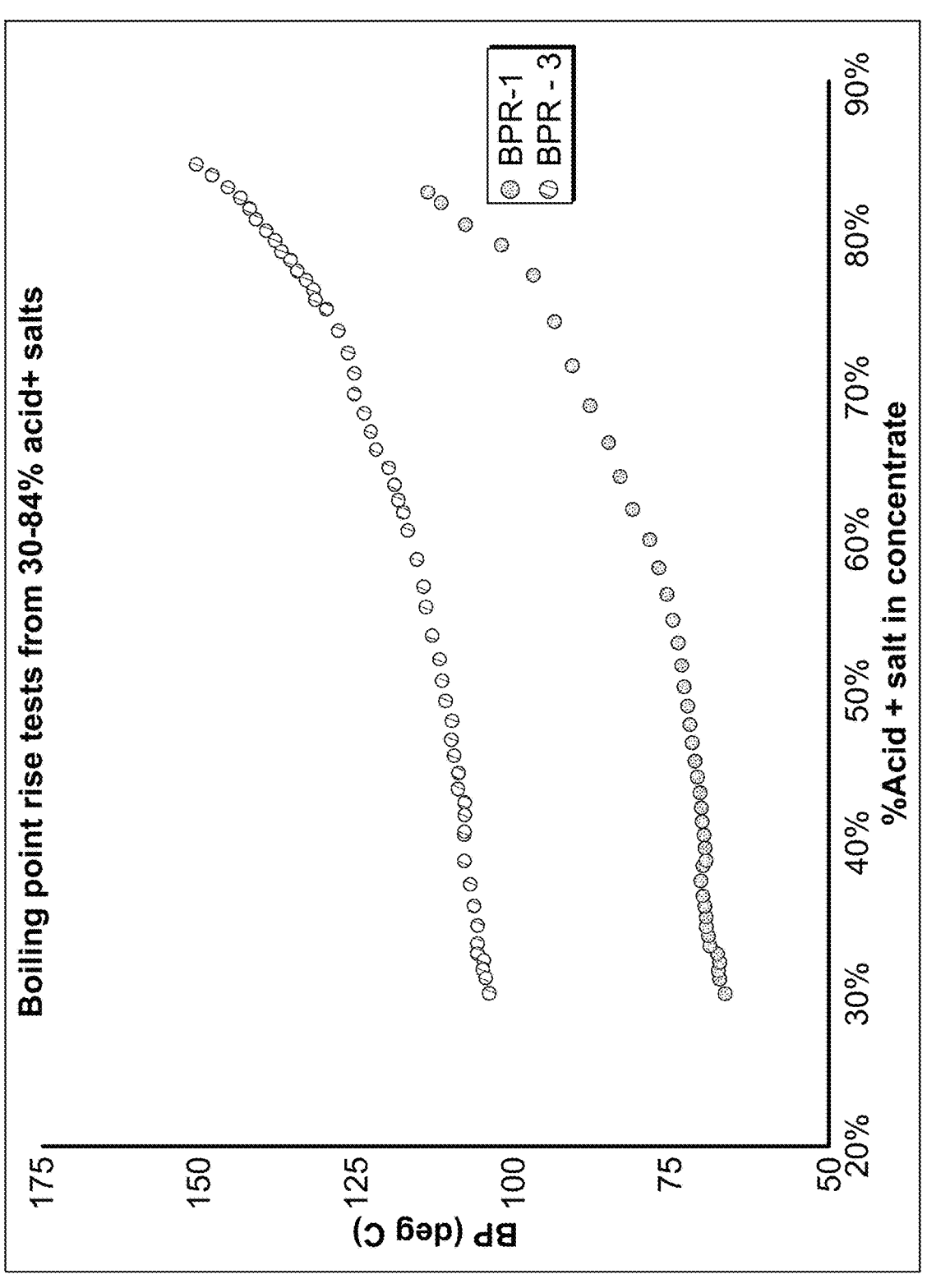
FIG. 11 is a plot showing boiling point (° C.) as a function of total acid and salts in concentrate (wt %) at ambient pressure (BPR-1; upper plot) and at a pressure of 17 kPa (BPR-3; lower plot) in the range from 30 wt % to 84 wt % total acid and salts according to comparative examples of the present disclosure.

The graphs in FIGS. 8-11 show the rises in boiling points for each test (FIG. 8: BPR-1 and BPR-2; FIG. 9: BPR-3; FIG. 10: BPR-4; FIG. 11: BPR-1 and BPR-3). The boiling point is the temperature measured in the solution or slurry which is denoted as the "flask temperature" in the data tables.

Table 15 contains data relating to pH measurements of the condensate obtained from tests BPR-1 to BPR-4.

TABLE 15

| | | Condensate pH measurements | | | | |
|---|---|---|---|---|---|---|
| Test | fraction | mass (g) | volume (mL) | density (g/mL) | pH measured | Appearance |
| BPR-1 | 1 | 160.05 | 162 | 0.99 | 4.3 | Clear, colourless |
| BPR-1 | 2 | 237.18 | 238 | 1.00 | 2.3 | Clear, colourless |
| BPR-2 | 1 | 160.87 | 162 | 0.99 | 1.68 | Clear, slightly yellow |
| BPR-3 | 1 | 248.68 | 250 | 0.99 | 3.77 | Clear, colourless |
| BPR-3 | 2 | 144.52 | 146 | 0.99 | 2.42 | Clear, colourless |
| BPR-4 | 1 | 160.71 | 162 | 0.99 | 1.58 | Clear, slightly yellow |

TABLE 14

| Crystallization point for tests BPR-1 and BPR-3 | | |
|---|---|---|
| Test | BPR-1 | BPR-3 |
| Crystallization Temp (° C.) | 107.8 | 69.8 |
| $H_2O$ | 59.6% | 61.6% |
| $H_2SO_4$ | 14.9% | 14.2% |
| $Li_2SO_4$ | 23.9% | 22.7% |
| $Na_2SO_4$ | 1.6% | 1.5% |
| Total Acid + Salts | 40.4% | 38.4% |

(g) Observations

The appearance of the solutions and point of crystal formation was observed for each of the tests. Due to the insulation required when heating the solution, constant observations were not made throughout the experiment.

Figure 12A:
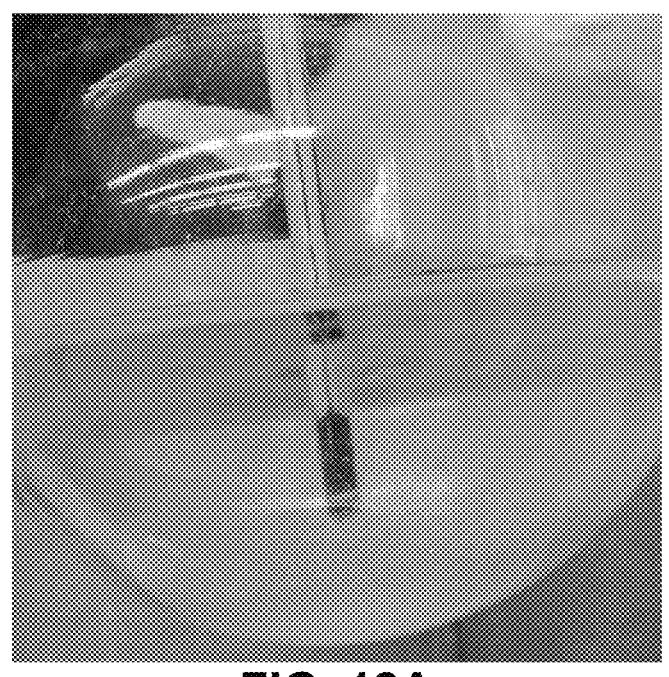
FIG. 12A shows a photograph of 40.6 wt % total acid and salts concentrate hot.
Figure 12B:
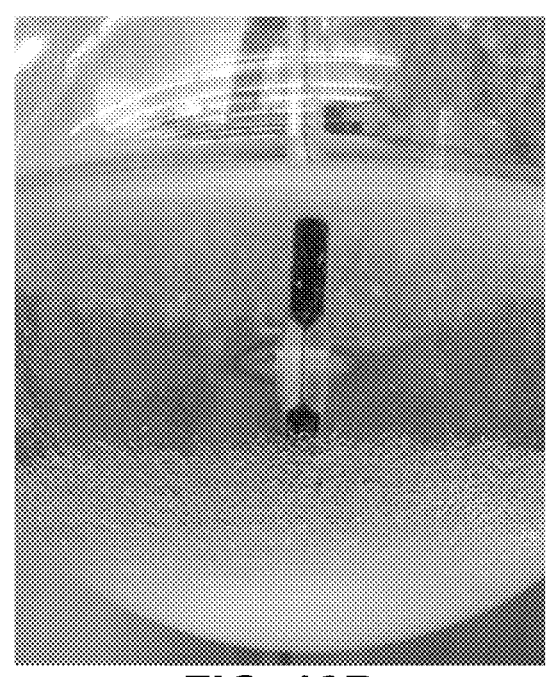
FIG. 12B shows a photograph of 40.6 wt % total acid and salts concentrate at room temperature.

BPR-1: The first part of the concentration was from 30-41% total acid and salts and no stir bar or boiling chips were used. The solution was clear and colourless initially and boiled smoothly. At 40.4% total acid and salts, the mixture began to bump and boiled more vigorously and crystals were observed in the concentrate. The crystals were clear, needle-like, and settled quickly to the bottom of the flask when the mixture was not agitated. The supernatant was clear and colourless. The first part of the concentration was stopped at 40.6% total acid and salts (FIG. 12A) and cooled overnight. Additional crystals formed at room temperature with nice, crystalline structures (FIG. 12B).

Figure 12C:
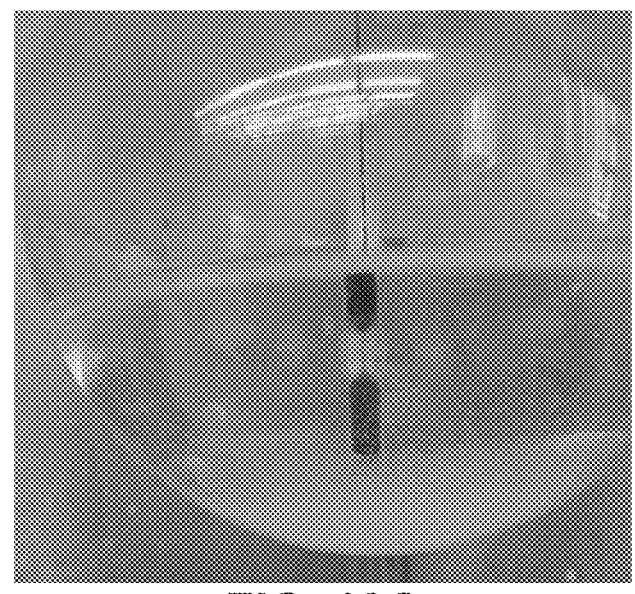
FIG. 12C shows a photograph of 49 wt % total acid and salts concentrate at temperature.
Figure 12D:
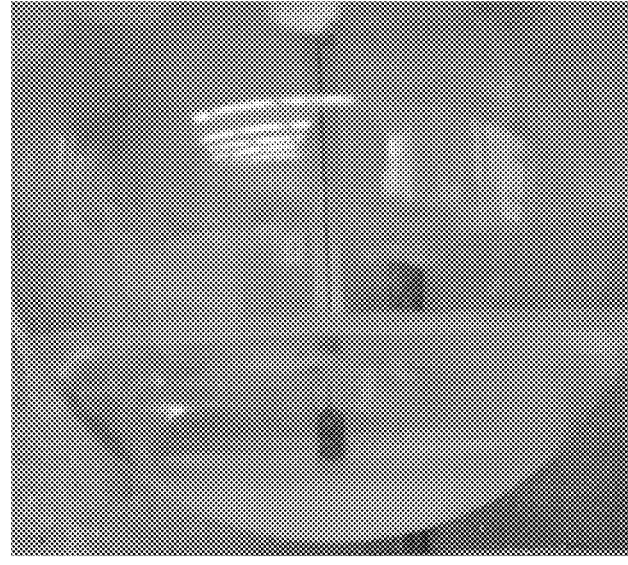
FIG. 12D shows a photograph of 57 wt % total acid and salts concentrate at temperature.
Figure 12E:
FIG. 12E shows a photograph of 69 wt % total acid and salts concentrate at temperature.
Figure 12F:
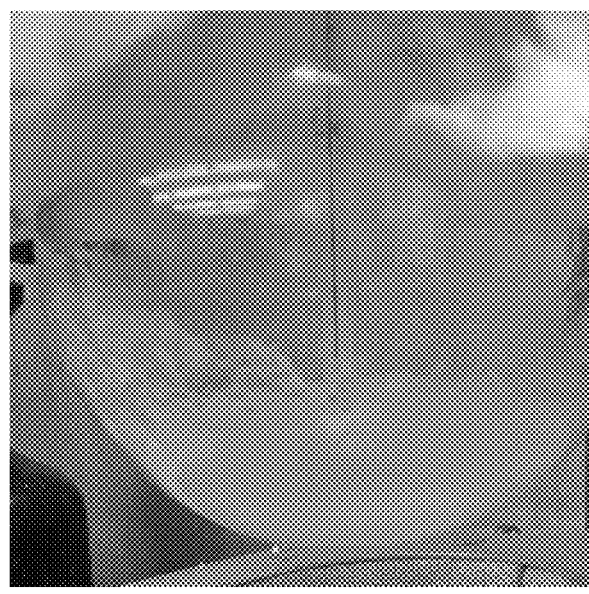
FIG. 12F shows a photograph of 75 wt % total acid and salts concentrate at temperature.
Figure 12G:
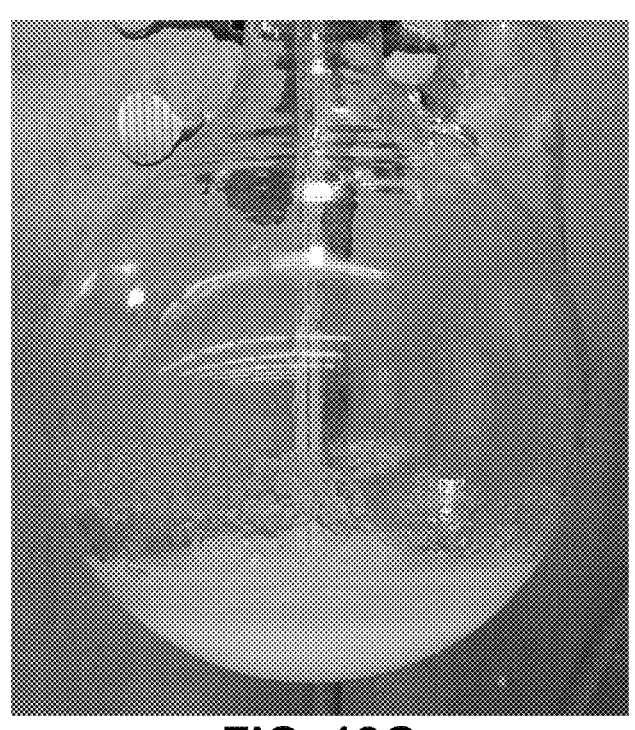
FIG. 12G shows a photograph of 84 wt % total acid and salts concentrate at temperature.
Figure 12H:
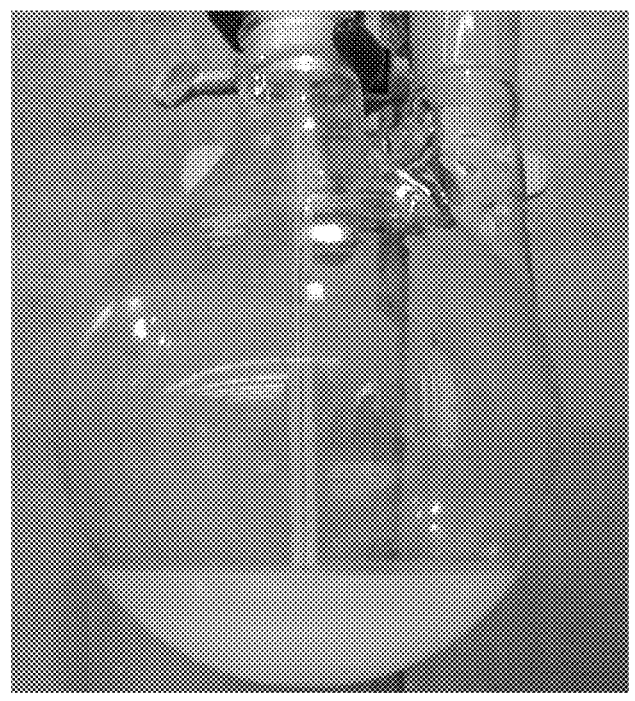
FIG. 12H shows a photograph of 84 wt % total acid and salts concentrate at room temperature according to comparative example BPR-1 of the present disclosure.

The second part of the concentration was from 41-84% total acid and salts. A boiling chip was added to the concentrating flask for the second part of the test. Some of the solids that had been present at room temperature redissolved when the mixture reached reflux. The mixture continued to boil quite vigorously and bump even with the boiling chip. From 40.6% to 56.6%, the appearance of the concentrate was very similar except for a slight increase in the amount of solids visible (see, for example, FIG. 12C which shows concentrate at 49% and FIG. 12D which shows concentrate at 57%). The solids were fine, needle-like white crystals which settled as soon as the boiling stopped. The supernatant was clear and colourless. At 69.3%, a larger solids layer was visible in the concentrate as shown in FIG. 12E. The solids appeared to be white and fine and the supernatant was slightly opaque and yellowed. Some solids were stuck to the walls of the flask. At 74.9%, the concentrate seemed quite viscous as shown in FIG. 12F. The final concentrate contained 84.4% total acid and salts and had a large layer of white solids in the bottom with a supernatant that was clear and colourless once the solids had settled to the bottom of the flask as shown in FIG. 12G. When cooled to room temperature, more solids precipitated with a very small layer of supernatant remaining as shown in FIG. 12H.

Figure 13A:
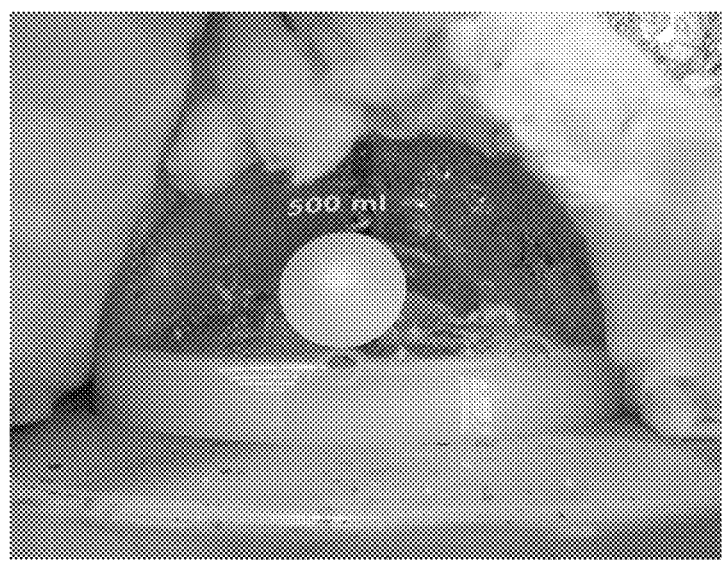
FIG. 13A shows a photograph of solution 2 while heating.
Figure 13B:
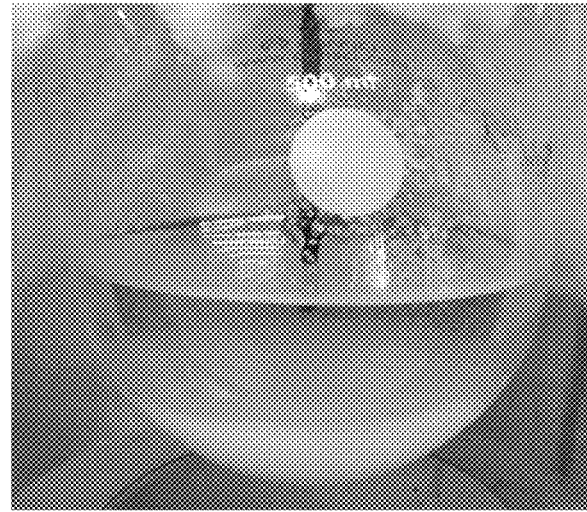
FIG. 13B shows a photograph of 76 wt % total acid and salts concentrate at temperature.
Figure 13C:
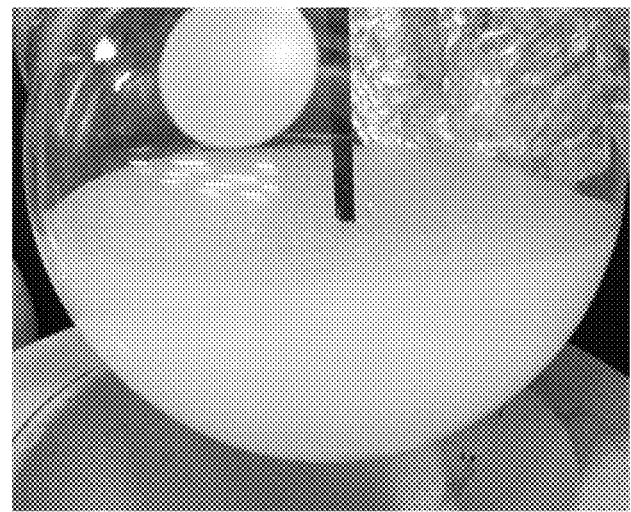
FIG. 13C shows a photograph of 76 wt % total acid and salts concentrate at room temperature.

BPR-2: The initial mixture was a thick, white slurry. The slurry was prepared using a magnetic stir plate, and the stirring was maintained for the test. The first part of the concentration was from 65-76% total acid and salts. Several hours of heating were required until the mixture reached reflux and condensate collection was started. Some of the initial solids dissolved with heating based on the visual appearance of the concentrate. However at no point did all of the solids go into solution (see, for example: FIG. 13A). During the concentration, the mixture appeared to be a white, bubbling slurry. At 71.3% the mixture began to boil and bump very vigorously, so the heating was lowered slightly. At 75.5% the hot concentrate had a layer of white solids that settled to the bottom of the flask and a clear and slightly yellow supernatant (FIG. 13B). The concentration was stopped at this point and cooled overnight. At room temperature (FIG. 13C) the whole mixture had crystallized. There appeared to be two layers of solids. The bottom layer had finer, white solids. The top layer which appeared to correspond to the supernatant layer contained larger, white, needle-like crystals.

Figure 13D:
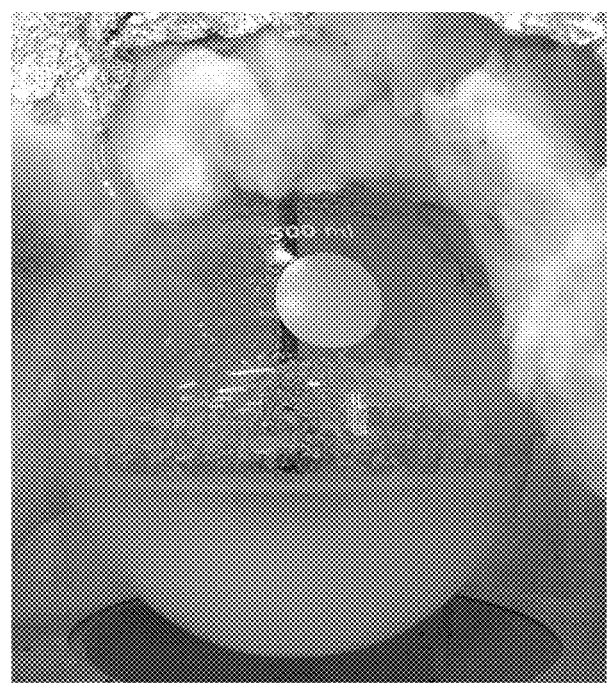
FIG. 13D shows a photograph of 93 wt % total acid and salts concentrate at temperature.
Figure 13E:
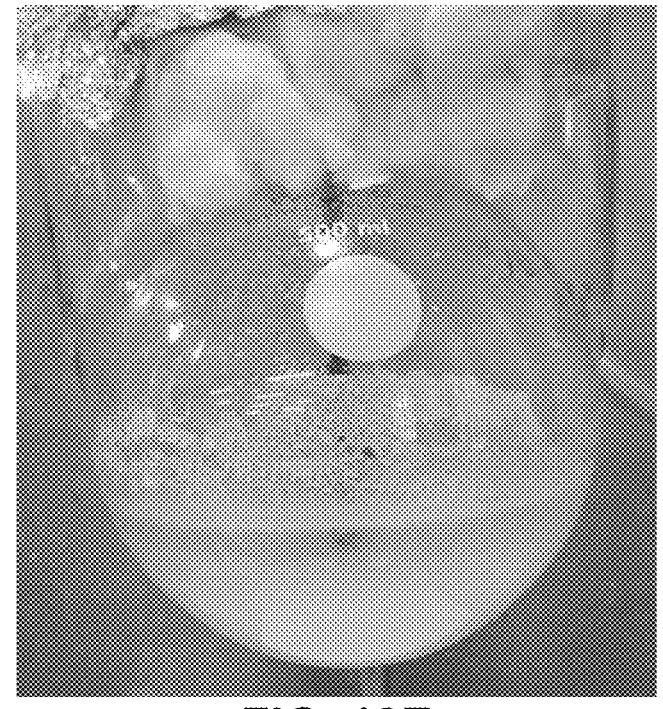

The second part of the concentration was from 76-96% total acid and salts. As the concentrate was heated to reflux, some of the crystals re-dissolved to form a slurry. The white slurry boiled mildly as it was concentrated. The appearance was quite consistent during the second part of the concentration. At 92.7%, mostly white solids were visible in the flask with a small amount of clear, yellow supernatant (FIG. 13D). At 96.0% concentrated, the test was stopped. The concentrate was a thick, white, bubbling slurry when hot. As the solids settled, but the mixture was still hot, a layer of slightly opaque and pale yellow supernatant was visible (see, for example: FIG. 13E).

BPR-3: BPR-3 was the first test performed under vacuum. The cold finger and condenser were cooled using a circulation water bath set at 10° C. instead of tap water which was used in the previous tests. The first part of the concentration was from 30-66% total acid and salts. The solution was clear, colourless and boiled mildly until 37.5%. At 38.4% the first solids were observed in the solution and they settled to the bottom of the flask when boiling stopped and were needle-like crystals. At 42.2%, the concentrate began to boil more vigorously. The receiving flask was switched at 50.1% concentration with the system being maintained at temperature and under vacuum. The amount of solids increased as the concentration proceeded. The supernatant was clear and colourless and the mixture boiled quite vigorously. At 66.2% total acid and salts the concentration was stopped (FIG. 14A) and the system was brought to atmospheric pressure and cooled to room temperature (FIG. 14B) overnight.

The second part of the concentration was from 66.2-82.5% total acid and salts (see FIG. 14C for 83% concentrate at temperature). The system was put under vacuum and heated to reflux before collection was started. The final concentrate had a layer of white solids at the bottom of the flask with a supernatant layer that appeared viscous, slightly opaque and pale yellow (FIG. 14D).

BPR-4: The initial slurry at 65% total acid and salts was very thick and sticky; the stir bar in the flask was not able to fully mix the system. A glass stir rod was used to assist in stirring while the solution was prepared. The slurry swelled significantly to almost fill the whole flask when first put under vacuum. The solution was then brought to the target vacuum of 3 kPa slowly to allow the swelling to subside. While not wishing to be limited by theory, the swelling was likely due to degassing of the slurry (FIG. 15A). The slurry was then brought to reflux under vacuum (FIG. 15B) and the first part of the concentration was from 64.9-70.5% total acid and salts (see, for example 15C, showing 69% concentrate at temperature). While not wishing to be limited by theory, it is likely that stirring did not occur during this step due to how thick the slurry was throughout. There were no visible changes in the solution from room temperature to at reflux. The 70.5% concentrate was cooled to room temperature and left at atmospheric pressure overnight. At room temperature, three distinct layers were visible in the 70.5% concentrate. The bottom layer was a solid white mass, encompassing the stir bar, stuck to the bottom of the flask. The middle layer was the largest and contained slurried/suspended solids that appeared to be a mix of needle-like crystals and finer, white solids. At the top there was a very thin layer of clear, colourless supernatant visible. The top two layers were easily stirred. The bottom solid layer was not easily stirred and could not be broken into smaller pieces with a spatula.

The second stage of the concentration was from 70.5-88.2% total acid and salts (see: FIG. 15D for 88% concentrate at temperature and FIG. 15E for 88% concentrate at room temperature). At reflux the solids mass did not dissolve or break up immediately. At approximately 75%, the boiling subsided and it took a while for reflux to resume. However, when the boiling and distilling resumed, the mixture appeared to be well-mixed and the stir bar was able to mix the solution. The distillation proceeded smoothly for the rest of the concentration.

The third stage of the concentration was from 88.2-96.0% total acid and salts. The solids appeared to fully disperse in the slurry at boiling. The final concentrate was a thick and opaque slurry (FIG. 15F).

Comparison of final concentrates: The concentrate from BPR-1 contained crystal-like, translucent white crystals with a clear, colourless supernatant (FIG. 16A). A thick slurry formed when the bottle was agitated. The concentrate from BPR-2 was a thick slurry with a very thin layer of viscous supernatant right at the surface (FIG. 16B). The very top layer of the solids and slurry could be scraped and mixed with the spatula (FIG. 16C), and the majority of the solids were in a solid mass at the bottom of the flask. The concentrate from BPR-3 was settled into three layers. The top layer was a thin supernatant, the middle layer appeared to contain crystalline, white solids and the bottom layer appeared to be settled solids that were finer than the middle layer. With agitation all three layers mixed together into a thick slurry (FIG. 16D). The concentrate from BPR-4 cooled into a solid mass with no excess liquid visible. The solids appeared to be in two layers (FIG. 16E). The solids at the top appeared to be more crystal-like and the solids at the bottom appeared to be finer and less crystalline than the top later. See also FIG. 16F for a side-by-side comparison of BPR-2 (right hand rbf) and BPR-4 (left hand rbf).

VI. Two-Stage Concentration and Filtration Tests

(a) Summary

A two-stage concentration and filtration test of a synthetic anolyte solution was completed at atmospheric pressure and under vacuum. Stage one of the experiment was the concentration of a synthetic anolyte solution from 33% to 71% total acid and salts. This was completed under vacuum at 17 kPa and at atmospheric pressure. The 71% solution was cooled to 30° C. and filtered. In the second stage, the resulting filtrate was concentrated further to 96% total acid and salts under a vacuum at 3 kPa for both experiments. The final concentrate was cooled to 30° C. to precipitate solids and filtered.

(b) Materials

Lithium Sulfate, anhydrous—≥98.0%, was from Aldrich Chemistry, product #62613-1KG, lot #BCBL6287V. Sodium sulfate, anhydrous, granular, free-flowing, Redi-Dri™, ACS reagent, 99%, was from Sigma-Aldrich, product #798592-500g, lot #MKBV7489V. All solutions were prepared with deionized water.

(c) Equipment

The concentration steps were performed using the same equipment that was used for the boiling point rise tests described in Example 1, section IV.

(d) Experimental

Stage 1 Concentration and Filtration

An initial solution of lithium sulfate, sodium sulfate and sulfuric acid was prepared in deionized water. A round bottom flask was charged with solution and equipped with a thermocouple, distillation apparatus and electric heating mantle. For test 1, the foregoing set-up was connected to a vacuum pump and the system brought to 17 kPa. The mixture in the flask was brought to a boil and water distilled off to reach the target concentration. The final mass of condensate and concentrate was recorded, the contents of the concentrating flask were transferred to a 500 mL Erlenmeyer flask and the flask submerged in a 30° C. circulating water bath overnight. The 30° C. concentrate was vacuum filtered through a 1.5 μm glass microfiber filter and the filtrate used to rinse any solids stuck to the glassware from previous steps into the filter cake. Finally, the filtrate was isolated, the filter cake rinsed thoroughly with ethanol and the crystals dried.

Stage 2 Concentration and Filtration

A known amount of filtrate from stage 1 was transferred into a 250 mL, 3-neck, round bottom flask. The flask was equipped with a thermocouple, distillation apparatus and electric heating mantle, connected to a vacuum pump and brought to 3 kPa. The mixture in the flask was brought to a boil and water distilled off to reach the target concentration. The final mass of condensate and concentrate was then recorded. The cooling and filtration steps of stage 2 were different in tests 1 and 2 as follows:

Test 1: The contents of the concentrating flask were transferred to a 250 mL Erlenmeyer flask and submerged in a 30° C. circulating water bath overnight. The 30° C. concentrate was vacuum filtered through a 1.5 μm glass microfiber filter. A portion of the filtrate was used to rinse any solids stuck to the glassware from previous steps into one Erlenmeyer, but not combined with the filter cake. The filter cake was rinsed thoroughly with ethanol and the crystals left to dry.

Test 2: The final concentrate was left to cool to ambient temperature with stirring. A camera equipped with a timer was used to take pictures at one minute intervals to note the temperature and appearance of concentrate while cooling. The concentrate was then left at 30° C. overnight to crystallize solids. The concentrate was heated to 99° C. slowly in an oil bath and observed to watch the solids re-dissolve. The concentrate was then cooled to 30° C. and vacuum filtered through a 1.5 μm glass microfiber filter. The filter cake was rinsed thoroughly with ethanol and the crystals left to dry.

Solids Settling Test

This was performed on the concentrate from test 1 stage 1 after cooling to 30° C. The 30° C. concentrate was transferred to a 250 mL graduated bottle. The concentrate was then agitated to fully suspend solids. The bottle was set on a bench and a timer started. The level of solids was recorded over time.

(e) Results

Table 16 contains a summary of the conditions of the tests:

TABLE 16

| | Summary of conditions for tests | | |
|---|---|---|---|
| Test | Pressure | Initial BP (° C.) | Final BP (° C.) |
| 1 stage 1 | 17 kPa | 60.6 | 81.9 |
| 1 stage 2 | 3 kPa | 41.6 | 228 |
| 2 stage 1 | atmospheric | 104.8 | 127.2 |
| 2 stage 2 | 3 kPa | 40.8 | 222 |

Test 1 stage 1 (17 kPa): The initial solution was prepared by mass. The amount of concentrate was determined by mass at the end of the concentration step and the composition was calculated by, while not wishing to be limited by theory, assuming that all condensate removed was water. The recovered and dried solids appeared as homogenous, translucent, needle-like crystals and were assumed, while not wishing to be limited by theory, to be all $Li_2SO_4$ monohydrate. The filtrate amount and composition was calculated as the difference between the concentrate and the recovered solids. The filtration was performed so that all solids were accounted for in the filter cake by rinsing all glassware into the filter with filtrate after the initial filtration. The total filtrate was calculated as the difference in mass between the concentrate and the recovered solids. The recovered filtrate was less than the calculated total due to transfer losses and filtrate entrained in the filter cake prior to rinsing with ethanol. Table 17 contains an overview of the composition data for test 1 stage 1.

TABLE 17

Composition data for test 1 stage 1 concentration and filtration

| | Initial | condensate | concentrate | Recovered solids | Total filtrate | Recovered filtrate |
|---|---|---|---|---|---|---|
| Component (g) | | | | | | |
| Total | 700.28 | 373.86 | 326.42 | 137.70 | 188.72 | 159.89 |
| $Li_2SO_4$ | 136.59 | | 136.59 | 118.31 | 18.29 | 15.49 |
| $Na_2SO_4$ | 9.11 | | 9.11 | 0.00 | 9.11 | 7.72 |
| $H_2SO_4$ | 85.40 | | 85.40 | | 85.40 | 72.36 |
| $H_2O$ | 469.17 | 373.86 | 95.31 | 19.39 | 75.92 | 64.32 |
| Acid + salts | 231.11 | | 231.11 | | 112.80 | 95.57 |
| $Li_2SO_4$ as monohydrate[1] | 158.98 | | 158.98 | 137.70 | 21.28 | 18.03 |
| Composition (wt %) | | | | | | |
| Total | 100.0% | 100.0% | 100.0% | 100.0% | 100.0% | 100.0% |
| $Li_2SO_4$ | 19.5% | 0.0% | 41.8% | 85.9% | 9.7% | 9.7% |
| $Na_2SO_4$ | 1.3% | 0.0% | 2.8% | 0.0% | 4.8% | 4.8% |
| $H_2SO_4$ | 12.2% | 0.0% | 26.2% | 0.0% | 45.3% | 45.3% |
| $H_2O$ | 67.0% | 100.0% | 29.2% | 14.1% | 40.2% | 40.2% |
| Acid + salts | 33.0% | 0.0% | 70.8% | 0.0% | 59.8% | 59.8% |
| $Li_2SO_4$ as monohydrate[1] | 22.7% | 0.0% | 48.7% | 100.0% | 11.3% | 11.3% |

[1]calculated based on amount of $Li_2SO_4$ present.

Test 1 stage 2 (3 kPa): The filtrate from stage 1 was used as the initial solution for stage 2. The test was done with 150 g of the filtrate, with the remaining recovered filtrate set aside. The final masses of the condensate and the final concentrate were measured. A mass lost was calculated as the difference between the initial filtrate and the sum of the concentrate and condensate samples. While not wishing to be limited by theory, the mass lost is likely due to condensation that remained on the walls of the distillation apparatus. The filtration step in stage 2 was difficult as the final concentrate was very viscous. It was not possible to use the filtrate to transfer all of the solids stuck to the glassware into the filter, so the amount of solids recovered only represents what was initially transferred into the filter after the solids were crystallized at 30° C. Transfer losses are not accounted for in either the solids or the filtrate from this step. Table 18 contains an overview of the composition data for test 1 stage 2.

TABLE 18 data for test 1 stage 2 concentration and filtration

| Sample | Mass (g) |
|---|---|
| Initial filtrate | 150.01 |
| Condensate | 56.65 |
| Final concentrate | 89.99 |
| Mass lost | 3.37 |
| Recovered solids | 7.16 |

Test 2 stage 1 (atmospheric pressure): The compositions of the initial solution and final compositions were determined as in test 1. Table 19 contains an overview of the composition data for test 2 stage 1 concentration.

TABLE 19

Composition data for test 2 stage 1 concentration

| | Initial | condensate | concentrate |
|---|---|---|---|
| Component (g) | | | |
| Total | 851.86 | 454.2 | 397.66 |
| $Li_2SO_4$ | 166.07 | | 166.07 |
| $Na_2SO_4$ | 11.08 | | 11.08 |
| $H_2SO_4$ | 101.87 | | 101.87 |
| $H_2O$ | 572.84 | 454.2 | 118.64 |
| Acid + salts | 279.02 | | 279.02 |
| $Li_2SO_4$ as monohydrate[1] | 193.29 | | 193.29 |
| Composition (wt %) | | | |
| Total | 100.0% | 100.0% | 100.0% |
| $Li_2SO_4$ | 19.5% | 0.0% | 41.8% |
| $Na_2SO_4$ | 1.3% | 0.0% | 2.8% |
| $H_2SO_4$ | 12.0% | 0.0% | 25.6% |
| $H_2O$ | 67.2% | 100.0% | 29.8% |
| Acid + salts | 32.8% | 0.0% | 70.2% |
| $Li_2SO_4$ as monohydrate[1] | 22.7% | 0.0% | 48.6% |

[1]calculated based on amount of $Li_2SO_4$ present.

The solids isolated by filtration were not homogenous; instead they appeared to be a mixture of translucent crystals similar to test 1, and amorphous white powdery solids. The composition of the solids was not determined, so the exact composition of the filtrate was also unknown. While not wishing to be limited by theory, the composition was assumed to be somewhere between if the solids were determined to be fully anhydrous $Li_2SO_4$ or fully $Li_2SO_4$ monohydrate. The two cases are laid out in Table 20.

TABLE 20

| | All Anhydrous $Li_2SO_4$ | | All $Li_2SO_4$ Monohydrate | |
| --- | --- | --- | --- | --- |
| | Crystals | Total filtrate | Crystals | Total filtrate |
| Component (g) | | | | |
| Total | 157.46 | 240.2 | 157.46 | 240.2 |
| $Li_2SO_4$ | 157.46 | 8.61 | 135.29 | 30.78 |
| $Na_2SO_4$ | 0.00 | 11.08 | 0.00 | 11.08 |
| $H_2SO_4$ | | 101.87 | | 101.87 |
| $H_2O$ | 0.00 | 118.64 | 22.17 | 96.47 |
| Acid + salts | | 121.56 | | 143.73 |
| $Li_2SO_4$ as monohydrate[1] | | | 157.46 | 35.83 |
| Composition (wt %) | | | | |
| Total | 100.0% | 100.0% | 100.0% | 100.0% |
| $Li_2SO_4$ | 100.0% | 3.6% | 85.9% | 12.8% |
| $Na_2SO_4$ | 0.0% | 4.6% | 0.0% | 4.6% |
| $H_2SO_4$ | 0.0% | 42.4% | 0.0% | 42.4% |
| $H_2O$ | 0.0% | 49.4% | 14.1% | 40.2% |
| Acid + salts | 0.0% | 50.6% | 0.0% | 59.8% |
| $Li_2SO_4$ as monohydrate[1] | | | 100.0% | 14.9% |

Possible compositions of solids from test 2 filtration 1

[1]calculated based on amount of $Li_2SO_4$ present.

Test 2 stage 2 (3 kPa): As the exact composition of the filtrate from stage 1 was not known, the end point of the stage 2 concentration was based on the boiling point measured in test 1 stage 2 as the conditions and final target concentration were the same for both tests. The concentration was stopped when the boiling point reached 222° C. The volume of condensate collected at that point fell in the target range calculated based on anhydrous lithium sulfate or lithium sulfate monohydrate being removed by filtration in stage 1. Table 21 contains an overview of the calculations for amount of condensate to remove and Table 22 contains an overview of the data for test 2 stage 2 concentration.

TABLE 21

Calculations for target amount of condensate to remove

| Initial | | |
| --- | --- | --- |
| Mass of concentrate (g) | 183.44 | 183.44 |
| $Li_2SO_4$ species | anhydrous | monohydrate |
| acid + salt content | 50.6% | 59.8% |
| Target Final | | |
| acid + salt content | 96% | 96% |
| Mass of concentrate (g) | 96.70 | 114.34 |
| mass of condensate (g) | 86.74 | 69.10 |

TABLE 22

Data for test 2 stage 2 concentration

| Sample | Mass (g) |
| --- | --- |
| Initial filtrate | 183.44 |
| Condensate | 71.6 |
| Final concentrate | 108.45 |
| Mass lost | 3.39 |

The filtration was performed after the precipitation and solubility testing on the final concentrate. The concentrate was transferred directly from the flask used for the experiment to the filter. Only a small amount of concentrate remained on the flask walls. This was transferred into the final cake with ethanol during the ethanol wash of the filter cake. Table 23 contains an overview of the data for test 2 stage 2 filtration.

TABLE 23

Data for test 2 stage 2 filtration

| Sample | Mass (g) |
| --- | --- |
| Concentrate | 108.45 |
| Solids recovered | 4.766 |
| Filtrate recovered | 100.24 |
| Mass lost | 3.444 |

Crystallization and solubility: Two experiments were performed to test the crystallization and solubility properties of the test 2 stage 2 concentrate. Tables 24 and 25 contain an overview of the results of these experiments.

TABLE 24

Observation of concentrate when cooled from final boiling point to 30° C.

| Time | Temperature | Appearance |
| --- | --- | --- |
| 0 min | 212° C. | Clear, pale yellow solution. No solids crystallized. |
| 91 min | 30° C. | No change in appearance. Stirring has slowed, which suggests increased viscosity of the concentrate. |

TABLE 25

Observation of concentrate when heated from room temperature to 99° C.

| Temperature | Appearance |
| --- | --- |
| Room temperature | Thick, opaque, slightly yellow slurry |
| 66° C. | Less viscous, opaque, slightly yellow slurry |
| 85° C. | No change in appearance |
| 99° C. | No change in appearance |

Note:
Concentrate was held at each temperature for at least 30 minutes

Solids characterization: The solids recovered from each filtration step were characterized by inspection and by measuring the pH of the solids in solution. A solution was made up of each solid in deionized water. Table 26 contains an overview of the properties of the filtered solids.

TABLE 26

| | | Properties of filtered solids | | | | |
|---|---|---|---|---|---|---|
| Test | Stage | Appearance | Mass (g) | Final vol (mL) | Conc. (g/L) | pH |
| 1 | 1 | Needle-like, translucent, white crystals | 2.50 | 25 | 100 | 3.57 |
| 1 | 2 | Powdery, white, chalky clumps of solids | 1.00 | 10 | 100 | 2.64 |
| 2 | 1 | A mix or needle-like crystals and white powdery solids | 2.51 | 25 | 100 | 2.89 |
| 2 | 2 | Powdery, white, chalky clumps of solids | 0.50 | 5 | 100 | 1.84 |

Condensate: Table 27 contains an overview of the results of pH measurements of condensate samples.

TABLE 27

| pH measurements of condensate samples | |
|---|---|
| Condensate | pH |
| Test 1 stage 1 | 2.84 |
| Test 1 stage 2 | 1.05 |
| Test 2 stage 1 | 3.05 |
| Test 2 stage 2 | 1.18 |

Solids setting test: The settling test was performed on the concentrate from test 1 stage 1 after it has been cooled to 30° C. and before filtration. The test was done in triplicate. The concentrate was at 30° C. at the beginning of the first test and all three tests were done in succession at room temperature. Table 28 contains the setting test data for test 1 concentrate.

TABLE 28

| Settling test data for test 1 concentrate at 30° C. | | | | | |
|---|---|---|---|---|---|
| Test 1 Liquid level = 177 mL | | Test 2 Liquid level = 174 mL | | Test 3 Liquid Level = 175 mL | |
| Time (min) | solid level (mL) | Time (min) | solid level (mL) | Time (min) | solid level (mL) |
| 0.4 | 170 | 0.6 | 165 | 0.2 | 170 |
| 1.8 | 160 | 1.3 | 160 | 1.6 | 160 |
| 3.7 | 150 | 2.8 | 150 | 3.4 | 150 |
| 9.0 | 146 | 4.1 | 145 | 6.7 | 146 |
| 16.3 | 145 | 6.9 | 140 | 11.4 | 144 |
| 20.3 | 142 | 15.0 | 138 | 20.0 | 143 |
| 22.4 | 140 | | | 25.0 | 142 |
| | | | | 30.0 | 141 |
| | | | | 35.0 | 141 |
| | | | | 45.0 | 141 |

(f) Observations

Test 1 stage 1: The final concentrate at 70.8 wt % total acid and salts contained white crystals and had a clear, colourless supernatant layer when the solids settled (FIG. 17A). When cooled to 30° C., the solids layer was larger and with a thin layer of supernatant (FIG. 17B).

Test 1 stage 2: The filtrate used as the initial solution for the concentration experiment was clear and colourless (FIG. 17C). The final concentrate was clear, yellow/brown and contained no solids at the final boiling point. The concentrate was cooled in the flask, then re-heated to reflux temperature under vacuum to re-dissolve solids so that the concentrate could be transferred to an Erlenmeyer flask for crystallization. Solids formed in the concentrate when cooled to 30° C. The resulting slurry was very thick with solids suspended throughout (FIG. 17D). The filtration was very slow and additional solids appeared to precipitate in the filtrate as the filtration proceeded. The filtrate was viscous and slightly yellow in colour.

Test 2 stage 1: The final concentrate at 70% acid and salts was a slurry with a layer of white solids that settled to the bottom of the flask with a clear and colourless supernatant (FIG. 18A). The concentrate was transferred to an Erlenmeyer flask for cooling and crystallization of solids. Initially the final concentrate was allowed to cool partially, however large chunks of solids formed that could not be transferred. The concentrate had to be heated to >100° C. to re-dissolve the large chunks of solids so that the concentrate could be fully transferred. The concentrate was cooled to ~75° C. at ambient temperature and then cooled to 30° C. in the water bath. The solution was maintained at 30° C. for 2 hours and then filtered.

Test 2 stage 2: The filtrate used as the initial solution for this experiment was clear and colourless (FIG. 18B). It turned from colourless to yellow, but remained clear throughout the experiment. No crystallization was observed in the initial cooling of the concentrate from boiling point to 30° C. The concentrate was left at 30° C. overnight, and crystals were observed in the concentrate. The crystals were translucent, very large, and the colour of the concentrate (FIGS. 18C-D). The supernatant was thick and clear. The concentrate was then left in the 30° C. water bath for the day. At the end of the day, the slurry appeared creamy with finer white solids in the concentrate in addition to the initial large crystals (FIG. 18E). After heating to 99° C. (FIG. 18F) and then cooling back to 30° C., the concentrate was thick and white/beige and no large crystals were apparent. The concentrate filtered very slowly. The filtrate was clear and colourless and the cake was opaque. Air was pulled through the filter cake until it looked like a thin layer of white/beige, powdery solids partially clumped together. After washing with ethanol and drying, the filter cake was made up of white, powdery and lumpy solids.

Tables 29, 30, 31 and 32 contain additional concentration data for test 1 stage 1, test 1 stage 2, test 2 stage 1 and test 2 stage 2, respectively.

TABLE 29

| Test 1 stage 1 concentration data | | | |
|---|---|---|---|
| Time (min) | Boiling point (° C.) | Head space (° C.) | Condensate (mL) |
| 0 | 60.6 | 55 | 0 |
| 30 | 62.3 | 57 | 55 |
| 54 | 62.6 | 58 | 102.5 |
| 81 | 62.9 | 58 | 160 |
| 105 | 63.7 | 58 | 200 |
| 123 | 64.7 | 58 | 225 |
| 144 | 65.7 | 58 | 255 |
| 160 | 66.9 | 58 | 275 |
| 184 | 69.1 | 59 | 305 |
| 206 | 71.9 | 60 | 330 |

TABLE 29-continued

| Test 1 stage 1 concentration data | | | |
| --- | --- | --- | --- |
| Time (min) | Boiling point (° C.) | Head space (° C.) | Condensate (mL) |
| 223 | 75.2 | 61 | 350 |
| 237 | 79.2 | 62 | 365 |
| 245 | 81.9 | 62.5 | 374 |

TABLE 30

| Test 1 stage 2 concentration data | | | |
| --- | --- | --- | --- |
| Time (min) | Boiling point (° C.) | Head space (° C.) | Condensate (mL) |
| 0 | 41.6 | 24 | 0 |
| 32 | 50.6 | 30 | 10 |
| 58 | 60.1 | 34 | 20 |
| 81 | 73.1 | 42 | 30 |
| 107 | 96.3 | 44 | 40 |
| 137 | 135.4 | 49 | 50 |
| 151 | 169.4 | 50.5 | 54 |
| 165 | 219 | 66 | 56 |
| 185 | 228 | 208 | 57 |

TABLE 31

| Test 2 stage 1 concentration data | | | |
| --- | --- | --- | --- |
| Time (min) | Boiling point (° C.) | Head space (° C.) | Condensate (mL) |
| 0 | 104.8 | 99 | 0 |
| 29 | 106.2 | 100 | 50 |
| 56 | 107.2 | 100 | 105 |
| 83 | 107.6 | 101 | 150 |
| 115 | 108.5 | 101 | 185 |
| 143 | 109.5 | 101 | 220 |
| 178 | 110.1 | 101 | 245 |
| 207 | 111.3 | 101 | 275 |
| 257 | 113.9 | 102 | 325 |
| 318 | 117.7 | 103 | 375 |
| 353 | 121 | 103 | 405 |
| 392 | 127.2 | 104 | 445 |
| 394 | 127.2 | 104 | 446 |
| 396 | 127.5 | 104 | 450 |
| 400 | 127.2 | 104 | 454 |

TABLE 32

| Test 2 stage 2 concentration data | | | |
| --- | --- | --- | --- |
| Time (min) | Boiling point (° C.) | Head space (° C.) | Condensate (mL) |
| 0 | 40.8 | 28.5 | 0 |
| 23 | 51.2 | 34 | 10 |
| 56 | 57.2 | 32 | 24 |
| 79 | 62.7 | 30 | 32 |
| 102 | 70.9 | 31 | 40 |
| 127 | 88.8 | 34 | 50 |
| 155 | 129.5 | 39 | 60 |
| 173 | 158.3 | 41 | 66 |
| 187 | 186.5 | 44 | 70 |
| 192 | 200 | 45 | 72 |
| 198 | 210 | 49 | 73 |
| 201 | 215 | 49 | 73 |
| 204 | 220 | 48 | 73 |
| 205 | 222 | 47.5 | 73 |

Example 2: Behaviour of Sulphuric Acid/Lithium Sulphate Solutions

The objective of the Example 2 testing is to study the behaviour of sulphuric acid/lithium sulphate solutions in a test campaign in a pilot SARC system. The key goals of the pilot testing are to:

Determine heat transfer behaviour of sulphuric acid/lithium sulphate solutions and, in so doing, develop process design basis information relevant to Example 1 and commercial scale SARCs to allow for scale-up;

Demonstrate ability to continuously re-concentrate a sulphuric acid/lithium sulphate solution in a few dedicated campaign trials. Each campaign includes the evaporation and subsequent crystallization of anolyte solution followed by concentration of the filtrate from the crystallization; and Confirm short-term material suitability in concentrated, hot solutions of sulphuric acid and lithium sulphate.

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

What is claimed is:

1. A process for treating an aqueous composition comprising lithium sulfate and sulfuric acid, said process comprising:

evaporatively crystallizing the aqueous composition comprising lithium sulfate and sulfuric acid under conditions to obtain crystals of lithium sulfate monohydrate and a lithium sulfate-reduced solution;

optionally separating the crystals of the lithium sulfate monohydrate from the lithium sulfate-reduced solution; and wherein the evaporative crystallization is carried out using a vapour recompression evaporator in which vapour from one effect is used to evaporate further vapour in either a different effect, or in the same effect by either operating an additional effect at a different pressure, or compressing the vapour and recondensing in a steam chest in the same effect.

2. The process of claim 1, wherein the aqueous composition comprising the lithium sulfate and sulfuric acid comprises from about 1 wt % to about 35 wt % of the lithium sulfate, based on the total weight of the aqueous composition.

3. The process of claim 1, wherein the aqueous composition comprising the lithium sulfate and sulfuric acid comprises from about 1 wt % to about 25 wt % of the sulfuric acid, based on the total weight of the aqueous composition.

4. The process of claim 3, wherein the process comprises:

cooling the lithium sulfate-reduced solution under conditions to obtain a further portion of crystals of lithium sulfate monohydrate and a lithium sulfate-further reduced solution comprising sulfuric acid; and separating the crystals of lithium sulfate monohydrate from the lithium sulfate-further reduced solution comprising sulfuric acid.

5. The process of claim 4, wherein the cooling is carried out at a temperature of from about 15° C. to about 80° C.

6. The process of claim 3, wherein the process further comprises concentrating the lithium sulfate-reduced solution under conditions to obtain an acidic condensate and a concentrate comprising sulfuric acid.

7. The process of claim 1, wherein the conditions to obtain crystals of the lithium sulfate monohydrate and the lithium sulfate-reduced solution further comprise evaporatively crystallizing the aqueous composition comprising lithium sulfate and sulfuric acid at a pressure that is lower than atmospheric pressure.

8. The process of claim 1, wherein the conditions to obtain crystals of the lithium sulfate monohydrate and the lithium sulfate-reduced solution further comprise evaporatively crystallizing the aqueous composition comprising lithium sulfate and sulfuric acid for a time in which the lithium sulfate-reduced solution contains a concentration of sulfuric acid that is less than about 65 wt %, based on the total weight of the lithium sulfate-reduced solution.

9. The process of claim 8, wherein the evaporative crystallization is carried out until the lithium sulfate-reduced solution has a sulfuric acid concentration of from about 30 wt % to about 65 wt %, based on the total weight of the lithium sulfate-reduced solution.

* * * * *